US012438476B2

(12) United States Patent
Nakayama et al.

(10) Patent No.: US 12,438,476 B2
(45) Date of Patent: Oct. 7, 2025

(54) POWER CONVERSION DEVICE

(71) Applicant: Mitsubishi Electric Corporation, Tokyo (JP)

(72) Inventors: Akito Nakayama, Tokyo (JP); Takuya Kajiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 110 days.

(21) Appl. No.: 18/276,447

(22) PCT Filed: Mar. 31, 2021

(86) PCT No.: PCT/JP2021/013862
§ 371 (c)(1),
(2) Date: Aug. 9, 2023

(87) PCT Pub. No.: WO2022/208735
PCT Pub. Date: Oct. 6, 2022

(65) Prior Publication Data
US 2024/0128889 A1    Apr. 18, 2024

(51) Int. Cl.
*H02M 7/49* (2007.01)
*H02M 7/483* (2007.01)
*H02M 1/32* (2007.01)

(52) U.S. Cl.
CPC .......... *H02M 7/49* (2013.01); *H02M 7/4835* (2021.05); *H02M 1/325* (2021.05); *H02M 7/4833* (2021.05)

(58) Field of Classification Search
CPC ....... H02M 7/483; H02M 7/4833; H02M 7/49
See application file for complete search history.

(56) References Cited

U.S. PATENT DOCUMENTS

| | | | |
|---|---|---|---|
| 2014/0078796 A1* | 3/2014 | Inoue | H02M 5/4585 |
| | | | 363/68 |
| 2014/0226373 A1 | 8/2014 | Park et al. | |
| 2017/0047860 A1* | 2/2017 | Fujii | H02M 7/2173 |
| 2017/0054294 A1 | 2/2017 | Lyu et al. | |
| 2018/0069488 A1* | 3/2018 | Mukunoki | H02M 7/483 |

(Continued)

FOREIGN PATENT DOCUMENTS

| | | |
|---|---|---|
| CN | 106357143 A | 1/2017 |
| JP | 2013-251933 A | 12/2013 |

(Continued)

OTHER PUBLICATIONS

International Search Report and Written Opinion mailed on Jun. 15, 2021, received for PCT Application PCT/JP2021/013862, filed on Mar. 31, 2021, 9 pages including English Translation.

(Continued)

*Primary Examiner* — Gary A Nash
(74) *Attorney, Agent, or Firm* — XSENSUS LLP

(57) ABSTRACT

A controlling circuitry of a power conversion device has a first control mode for controlling circulation current circulating among leg circuits for the respective phases in a power converter so that an AC component having a frequency that is an even multiple other than a multiple of 3 with respect to the frequency of a fundamental component of AC is contained in the circulation current, and determines whether to make the first control mode active or inactive, on the basis of the voltage value of an energy storage element.

20 Claims, 12 Drawing Sheets

(56) References Cited

U.S. PATENT DOCUMENTS

2020/0083799 A1* 3/2020 Ishida .................... H02M 1/32
2023/0041013 A1   2/2023 Nakayama et al.

FOREIGN PATENT DOCUMENTS

| JP | 2016-123159 A | 7/2016 |
| JP | 2018-196237 A | 12/2018 |
| JP | 2019-030106 A | 2/2019 |
| JP | 2020-054223 A | 4/2020 |
| JP | 6783419 B1 | 11/2020 |
| WO | WO-2019215842 A1 * | 11/2019 |
| WO | 2021/199149 A1 | 10/2021 |

OTHER PUBLICATIONS

Extended European Search Report issued Jan. 31, 2024 in European Patent Application No. 21934901.6, 9 pages.

* cited by examiner

POWER CONVERSION DEVICE

CROSS-REFERENCE TO RELATED APPLICATION

The present application is based on PCT filing PCT/JP2021/013862, filed Mar. 31, 2021, the entire contents of which are incorporated herein by reference.

TECHNICAL FELD

The present disclosure relates to a power conversion device.

BACKGROUND ART

In recent years, as a high-voltage large-capacity power conversion device applied to a high-voltage grid such as a power grid, a power conversion device having a multilevel converter formed by connecting a plurality of converter cells each including a capacitor in series in a multiplexed manner are being put into practice. Such a power converter is called a modular multilevel converter (MMC) type, a cascaded multilevel converter (CMC) type, or the like.

In the power converter formed by connecting a plurality of converter cells in series in a multiplexed manner as described above, each converter cell includes a capacitor. The capacitor is one of factors that increase the size of the converter cell and is required to be downsized. For downsizing the capacitor, the capacitance thereof needs to be reduced. However, reducing the capacitance increases pulsation of voltage applied to the capacitor. In order to suppress voltage pulsation of the capacitor, the fallowing power conversion device is disclosed.

That is, a conventional power conversion device includes three arm units provided correspondingly for the a respective phases of three-phase AC. Each arm unit includes at least one converter including a power storage unit and a switching element. A control unit at the power conversion device controls the switching elements so that auxiliary circulation current containing a frequency component that is an even multiple of the frequency of the three-phase AC is added to circulation current flowing through the arm units. (see, for example, Patent Document 1).

CITATION LIST

Patent Document

Patent Document 1: Japanese Laid-Open Patent Publication No. 2018-196237

SUMMARY OF THE INVENTION

Problem to be Solved by the Invention

However, in the conventional power conversion device as described above, although causing the auxiliary circulation current to flow has an advantage of suppressing voltage pulsation of the capacitor, power loss of the power conversion device increases depending on the operation state of the power conversion device, thus causing a problem that loss might become greater.

The present disclosure has been made to solve the above problem, and an object of the present disclosure is to provide a power conversion device that can reduce voltage pulsation of a capacitor without greatly increasing power loss.

Means to Solve the Problem

A power conversion device according to the present disclosure includes: a power converter which performs power conversion between plural-phase AC and DC and includes, for the respective phases of the AC, leg circuits each having a pair of arms connected in series to each other, each arm including a plurality of converter cells which are connected in series and each of which includes an energy storage element and a plurality of semiconductor elements, the leg circuits being connected in parallel between positive and negative DC terminals; and a control unit which controls the power converter. The control unit has a first control mode for controlling circulation current circulating among the leg circuits for the respective phases in the power converter so that an AC component having a frequency that is an even multiple other than a multiple of 3 with respect to a frequency of a fundamental component of the AC is contained in the circulation current. The control unit determines whether to make the first control mode active or inactive, on the basis of a voltage value of the energy storage element.

Effect of the Invention

The power conversion device according to present disclosure makes it possible to provide a power conversion device that can reduce voltage pulsation of a capacitor without greatly increasing power loss.

DESCRIPTION OF EMBODIMENTS

Embodiment 1

Figure 1:
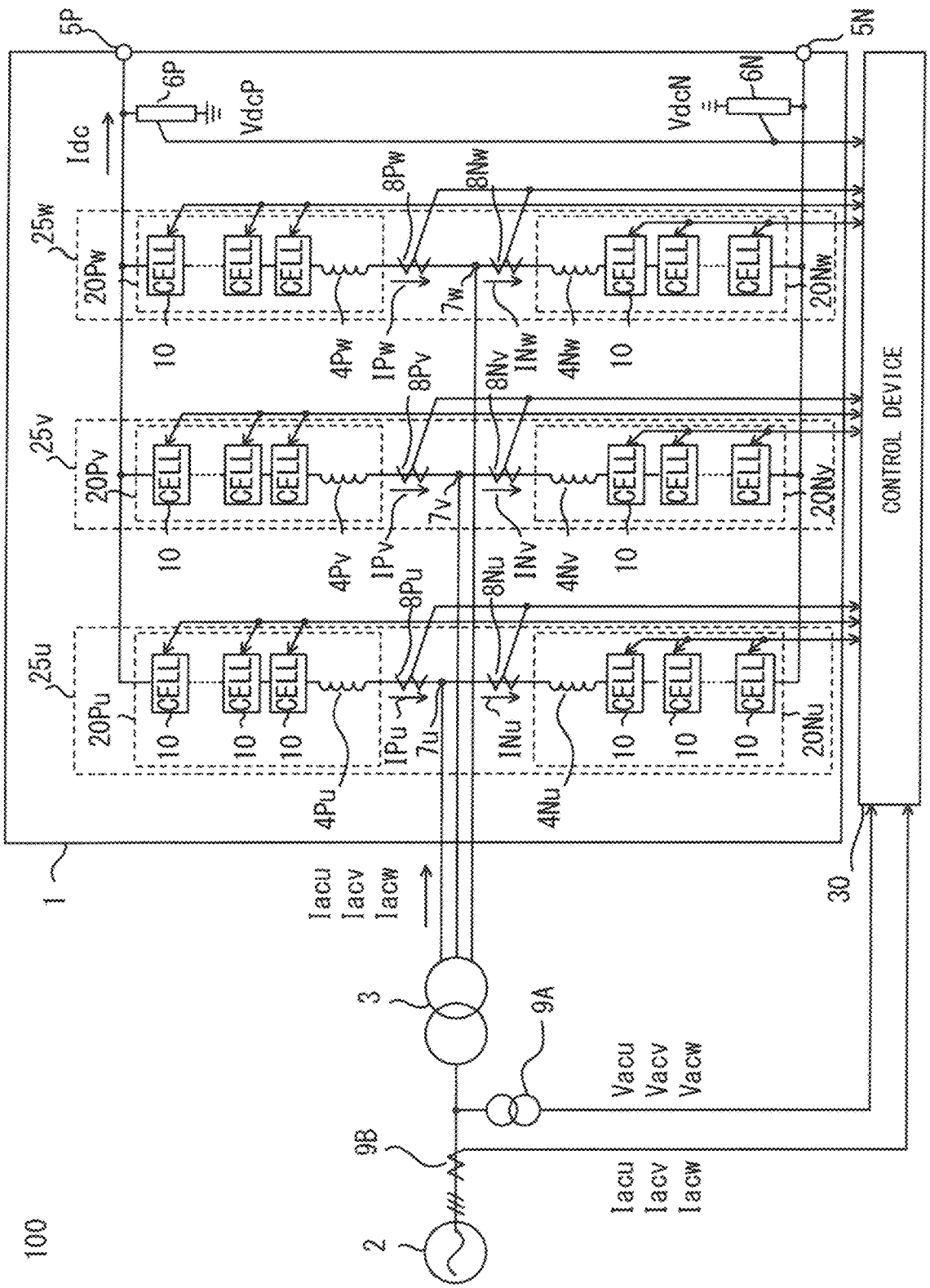
FIG. 1 is a block diagram showing the schematic configuration of a power conversion device according to embodiment 1.

FIG. 1 is a block diagram showing the schematic configuration of a power conversion device 100 according to embodiment 1.

The power conversion device 100 includes a power converter 1 which is provided between a plural-phase AC circuit which is an AC grid and a DC circuit as a DC grid and performs conversion from AC to DC or conversion opposite thereto between both circuits, and a control device 30 as a control unit for controlling the power converter 1.

The power converter 3 is a modular multilevel converter formed by connecting a plurality of converter cells in series in a multiplexed manner, as the configuration thereof is described below. Here, the "converter cell" is also called a "sub module", an "SM", or a "unit converter".

The power converter 1 includes a plurality of leg circuits provided respectively for the plurality of phases forming the AC circuit, between the high-potential side and the low-potential side of the DC circuit. In the present embodiment, as shown in FIG. 1, an AC circuit 2 is a three-phase AC grid, and three leg circuits 25u, 25v, 25w connected in parallel between a positive DC terminal SP on the high-potential side and a negative DC terminal SN on the low-potential side are provided correspondingly for respective phases u, v, w.

Hereinafter, when the leg circuits 25u, 25v, 25w for the respective phases are collectively mentioned without discrimination or any of them is mentioned, they are referred to as leg circuits 25.

The leg circuits 25u, 25v, 25w for the respective phases each include a pair of arms respectively connected to the high-potential side and the low-potential side of the DC circuit. Specifically, the leg circuits 25u, 25v, 25w for the respective phases include upper arms 20Pu, 20Pv, 20Pw on the high-potential side from the positive DC terminal 5P to AC input/output terminals 7u, 7v, 7w, and lower arms 20Nu, 20Nv, 20Nw on the low-potential side from the negative DC terminal 5N to the AC input/output terminals 7u, 7v, 7w.

The upper arms 20Pu, 20Pv, 20Pw and the lower arms 20Nu, 20Nv, 20Nw are connected in series to each other in the respective phases, and connection points therebetween, i.e., the Ac input/output terminals 7u, 7v, 7w, are connected to the AC circuit 2 via a transformer 3.

Hereinafter, when the leg circuits 25u, 25v, 25w for the respective phases are collectively mentioned without discrimination or any of them is mentioned, they are referred to as leg circuits 25. Similarly, when the AC input/output terminals 7u, 7v, 7w for the respective phases are collectively mentioned without discrimination or any of them is mentioned, they are referred to as AC input/output terminals 7.

The positive DC terminal 5P and the negative DC terminal 5N connected in common to the leg circuits 25 are connected to the DC circuit (not shown). The DC circuit is a DC power grid including a DC power transmission network or the like, or another power conversion device, for example. In the latter case, two power conversion devices are connected to form a back to back (BTB) system for connecting AC power grids that are different in rated frequency or the like.

Hereinafter, the detailed configuration of the leg circuit 25 will be described using the leg circuit 25u provided for U phase as a representative. The leg circuit 25v provided for V phase and the leg circuit 25w provided for W phase have the same configuration as the leg circuit 25u for U phase, and therefore the description thereof is omitted.

The upper arm 20Pu of the leg circuit 25u provided for U phase includes a plurality of converter cells 10 (10_1 to 10_Ncell) connected in cascade and a reactor 4Pu connected in series to the converter cells 10. Here, the number of the converter cells 10 include in the upper arm 20Pu is denoted by Ncell, and Ncell≥2 is satisfied.

The lower arm 20Nu of the leg circuit 25u provided for U phase includes a plurality of converter cells 10 (10_1 to 10_Ncell) connected in cascade and a reactor 4Nu connected in series to the converter cells 10. Here, the number of the converter cells 10 included in the lower arm 20Nu is denoted by Ncell, and Ncell≥2 is satisfied.

In the following description, the converter cells 10_1 to 10_Ncell may be referred to as converter cells 10. Here, indices j (1 to Ncell) indicating the respective converter cell 10 are irrelevant to physical arrangement of the converter cells 10 in the power converter 1.

The position where the reactor 4Pu is interposed may be any position in the upper arm 20Pu, and the position where the reactor 4Nu is interposed may be any position in the lower arm 20Nu. Each of the reactors 4Pu, 4Nu may include a plurality of reactors. The inductance values of the reactors 4Pu, 4Nu may be different from each other. A configuration in which only either of the reactor 4Pu of the upper arm 20Pu or the reactor 4Nu of the lower arm 20Nu is provided may be adopted.

The leg circuits 25u, 25v, 25w may be connected to the AC circuit 2 via interconnection reactors (not shown), instead of using the transformer 3 shown in FIG. 1. Further, instead of the AC input/output terminals 7u, 7v, 7w of the power converter 1, primary windings may be provided to the leg circuits 25u, 25v, 25w, and the leg circuits 25u, 25v, 25w may be connected in an AC manner to the transformer 3 or the above interconnection reactors via secondary windings magnetically coupled with the primary windings. That is, the leg circuits 25u, 25v, 25w are connected to the AC circuit 2, electrically, i.e., in a DC or AC manner, via the AC input/output terminals 7u, 7v, 7w or connection portions such as the primary windings and the secondary windings.

The power conversion device 100 further includes an AC voltage detector 9A, an AC current detector 9B, DC voltage detectors 6P, 6N, and arm current detectors 8F, 8N (8Pu, 8Nu, 8Pv, 8Nv, 8Pw, 8Nw) provided to the respective leg circuits 25, as detectors for measuring electric quantities such as currents and voltages used for control. Signals indicating the electric quantities detected by the above detectors are inputted to the control device 30.

For facilitating understanding in FIG. 1, signal lines for signals inputted from the detectors to the control device 30 and signal lines for signals inputted/outputted between the control device 30 and the converter cells 10 are shown collectively in part, but such a signal line is actually provided to each of the detectors and the converter cells 10. The signal lines between the converter cells 10 and the control device 30 may be provided for transmission and for reception, separately. The signal lines are formed by optical fibers, for example.

Hereinafter, the above detectors will be specifically described.

The AC voltage detector 9A detectors AC voltage Vacu for U phase, AC voltage Vacv for V phase, and AC voltage Vacw for W phase of the AC grid. In the following description, the AC voltages Vacu, Vacv, Vacw are collectively referred to as AC voltages Vac.

The AC current detector 9B detects AC current Iacu for U phase, AC current Iacv for V phase, and AC current Iacw for W phase of the AC grid. In the following description, the AC currents Iacu, Iacv, Iacw are collectively referred to as AC currents Iac.

The DC voltage detector 6P detects DC voltage VdcP of the positive DC terminal 5P. The DC voltage detector 6N detects DC voltage VdcN of the negative DC terminal 5N.

A difference between the DC voltage VdcP and the DC voltage VdcN is defined as DC voltage Vdc.

The arm current detectors 8Pu and 8Nu provided to the leg circuit 25u for U phase respectively detect upper arm current Ipu flowing through the upper arm 20Pu and lower arm current INu flowing through the lower arm 20Nu.

The arm current detectors 8Pv and 8Nv provided to the leg circuit 25v for V phase respectively detect upper arm current IPv flowing through the upper arm 20Pv and lower arm current INv flowing through the lower arm 20Nv.

The arm current detectors 8Pw and 8Nw provided to the leg circuit 25w for W phase respectively detect upper arm current IPw flowing through the upper arm 20Pw and lower arm current INw flowing through the lower arm 20Nw.

In the following description, the upper arm currents IPu, IPv, IPw are collectively referred to as upper arm currents IarmP. In addition, the lower arm currents INu, INv, INw are collectively referred to as lower arm currents IarmN. In addition, the upper arm current IarmP and the lower arm current IarmN are collectively referred to as arm currents Iarm.

Hereinafter, the configuration of the converter cells 10 forming each arm 20 will be described.

Figure 2:
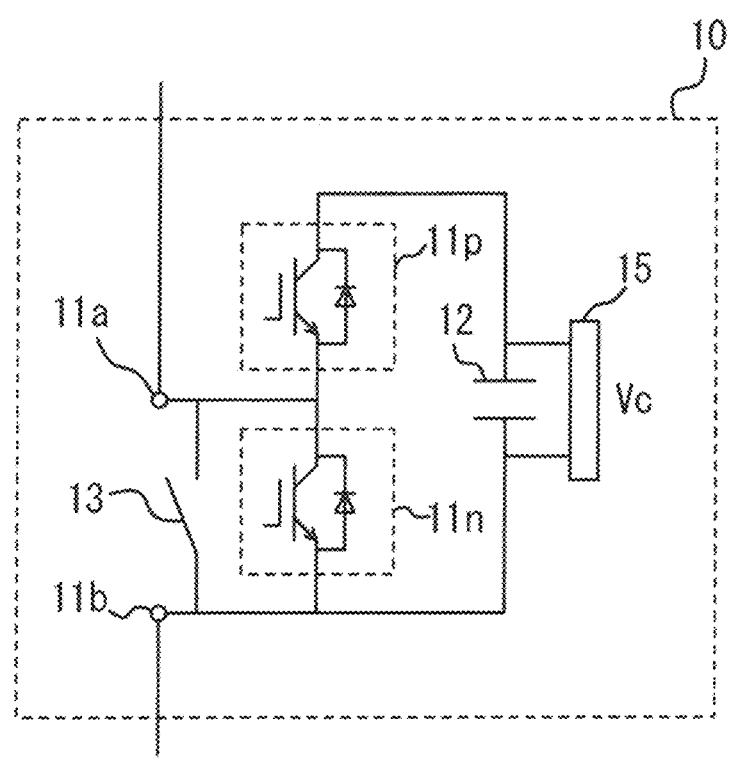
FIG. 2 shows an example of the circuit configuration of a converter cell included in a power converter according to embodiment 1.

FIG. 2 shows an example of the circuit configuration of the converter cell 10 included in the power converter 1 according to embodiment 1.

Figure 3:
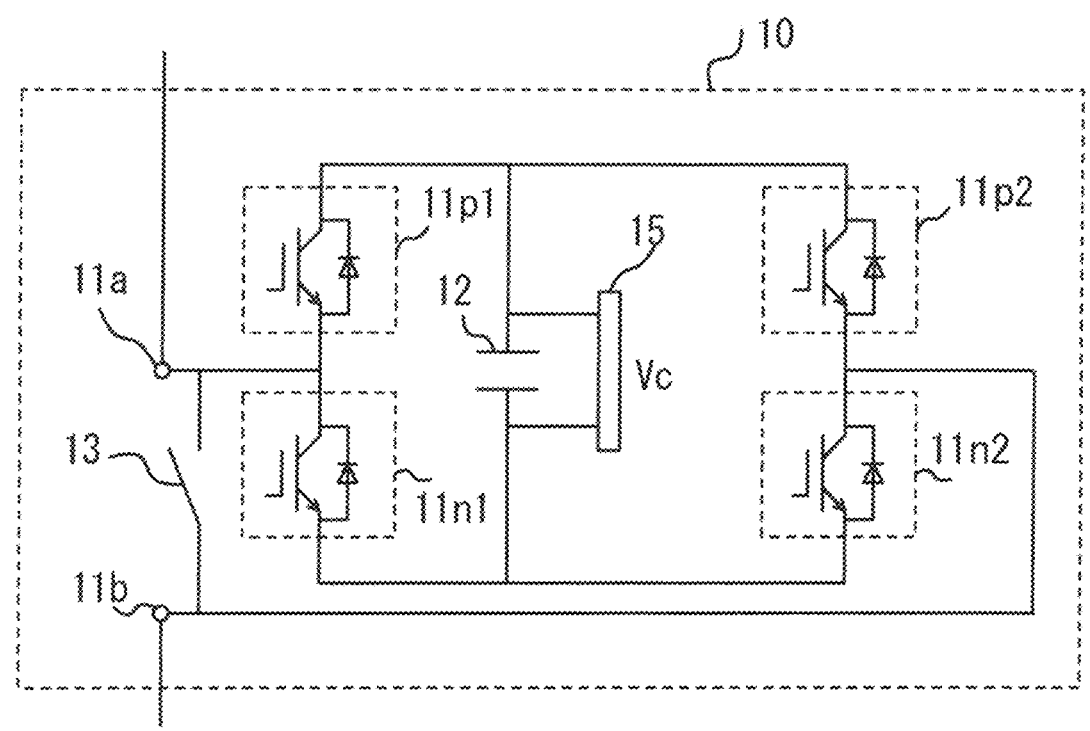
FIG. 3 shows an example of the circuit configuration of a converter cell included in the power converter according to embodiment 1.

FIG. 3 shows an example of the converter cell 10 included in the power converter 1 according to embodiment 1, which is different from the circuit configuration shown in FIG. 2.

The converter cell 10 shown in FIG. 2 has a circuit configuration called a half-bridge configuration.

The converter cell 10 includes a series unit formed by connecting two switching elements 11p, 11n as semiconductor elements in series, and a capacitor 12 as an energy storage element connected in parallel to the series unit.

Both terminals of the switching element 11n serve as input/output terminals 11a, 11b of the converter cell 10.

Further, the converter cell 10 includes a voltage detector 15 for detecting voltage Vc across the capacitor 12, and a bypass switch 13 connected between the input/output terminals 11a, 11b.

Through switching operations of the switching elements 11p, 11n, voltage across the capacitor 12 and zero voltage are outputted. For example, when the switching element 11p is ON and the switching element 11n is OFF, voltage across the capacitor 12 is outputted. When the switching element 11p is OFF and the switching element 11n is ON, zero voltage is outputted.

By turning the bypass switch 13, the input/output terminals 11a, 11b of the converter cell 10 are short-circuited. By short-circuiting the converter cell 10, elements included in the converter cell 10 are protected from overcurrent occurring at the time of short-circuit or the like.

The converter cell 10 shown in FIG. 3 has a circuit configuration called a full-bridge configuration.

The converter cell 10 includes a first series unit formed by connecting two switching elements 11p1, 11n1 as semiconductor elements in series, a second series unit formed by connecting two switching elements 11p2, 11n2 as semiconductor or elements in series, and a capacitor 12 as an energy storage element connected in parallel to the first series unit and the second series unit.

A connection point between the switching element 11p1 and the switching element 11n1 forming the first series unit, and a connection point between the switching element 11p2 and the switching element 11n2 forming the second series unit, respectively serve as input/output terminals 11a, 11b of the converter cell 10.

Further, the converter cell 10 includes a voltage detector 15 for detecting voltage Vc across the capacitor 12, and a bypass switch 13 connected between the input/output terminals 11a, 11b.

Through switching operations of the switching elements 11p1, 11n1, 13p2, 11n2, voltage across the capacitor 12 or zero voltage is outputted.

By turning on the bypass switch 13, the input/output terminals 11a, 11b of the converter cell 10 are short-circuited. By short-circuiting the converter cell 10, elements included in the converter cell 10 are protected from overcurrent occurring at the time of snort-circuit or the like.

In FIG. 2 and FIG. 3, the switching elements 11 (11p, 11n, 11p1, 11n1, 11p2, 11r2) are each formed of a self-turn-off semiconductor switching element, such as an insulated gate bipolar transistor (IGBT) or a gate commutated turn-off (GCT) thyristor, to which a freewheeling diode (FWD) is connected in antiparallel, for example.

In FIG. 2 and FIG. 3, as the capacitor 12, a capacitor such as a film capacitor is mainly used. In the following description, a case where the converter cell 10 has a half-bridge configuration shown in FIG. 2 and semiconductor switching elements are used as the switching elements 11p, 11n, will be described as an example. However, the convertor cell 10 composing the power converter 1 may have a full-bridge configuration shown in FIG. 3. A converter cell having a configuration other than those shown in FIG. 2 and FIG. 3, e.g., a circuit configuration called a clamped double cell, may be used, and also, the switching elements are not limited to the above ones.

Figure 4:
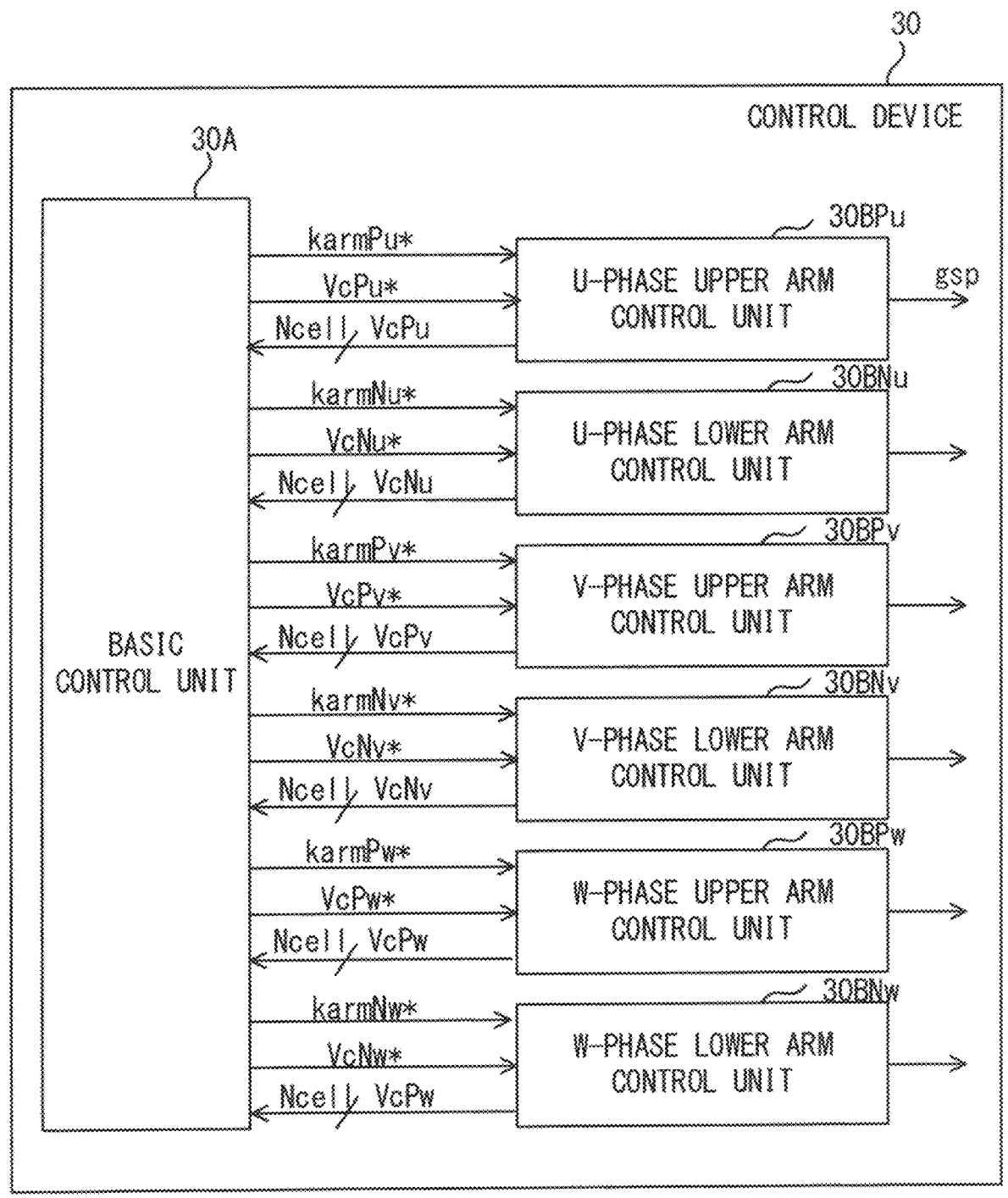
FIG. 4 shows the internal configuration of a control device of the power conversion device according to embodiment 1.

FIG. 4 shows the internal configuration of the control device 30 of the power conversion device 100 according to embodiment 1.

The control device 30 includes a basic control unit 30A which performs command for output voltages of the converter cells 10 in each arm 20, and a U-phase upper arm control unit 30BPu, a U-phase lower arm control unit 30BNu, a V-phase upper arm control unit 30BPv, a V-phase lower arm control unit 30BNv, a W-phase upper arm control unit 30BPw. and a W-phase lower arm control unit 30BNw which generate gate signals for the arms 20 on the basis of commands from the basic control unit 30A.

In the following description, when the U-phase upper arm control unit 30BPu, the U-phase lower arm control unit 30BNu, the V-phase upper arm control unit 30BPv, the V-phase lower arm control unit 30BNv, the W-phase upper arm control unit 30BPw, and the W-phase lower arm control unit 30BNw for the respective phase arms are collectively mentioned without discrimination, they are referred to as arm control units 30B.

Hereinafter, the internal configurations of the basic control unit 30A and the arm control units 30B shown in FIG. 4 will be described with reference to FIG. 5 and FIG. 6, respectively.

Figure 5:
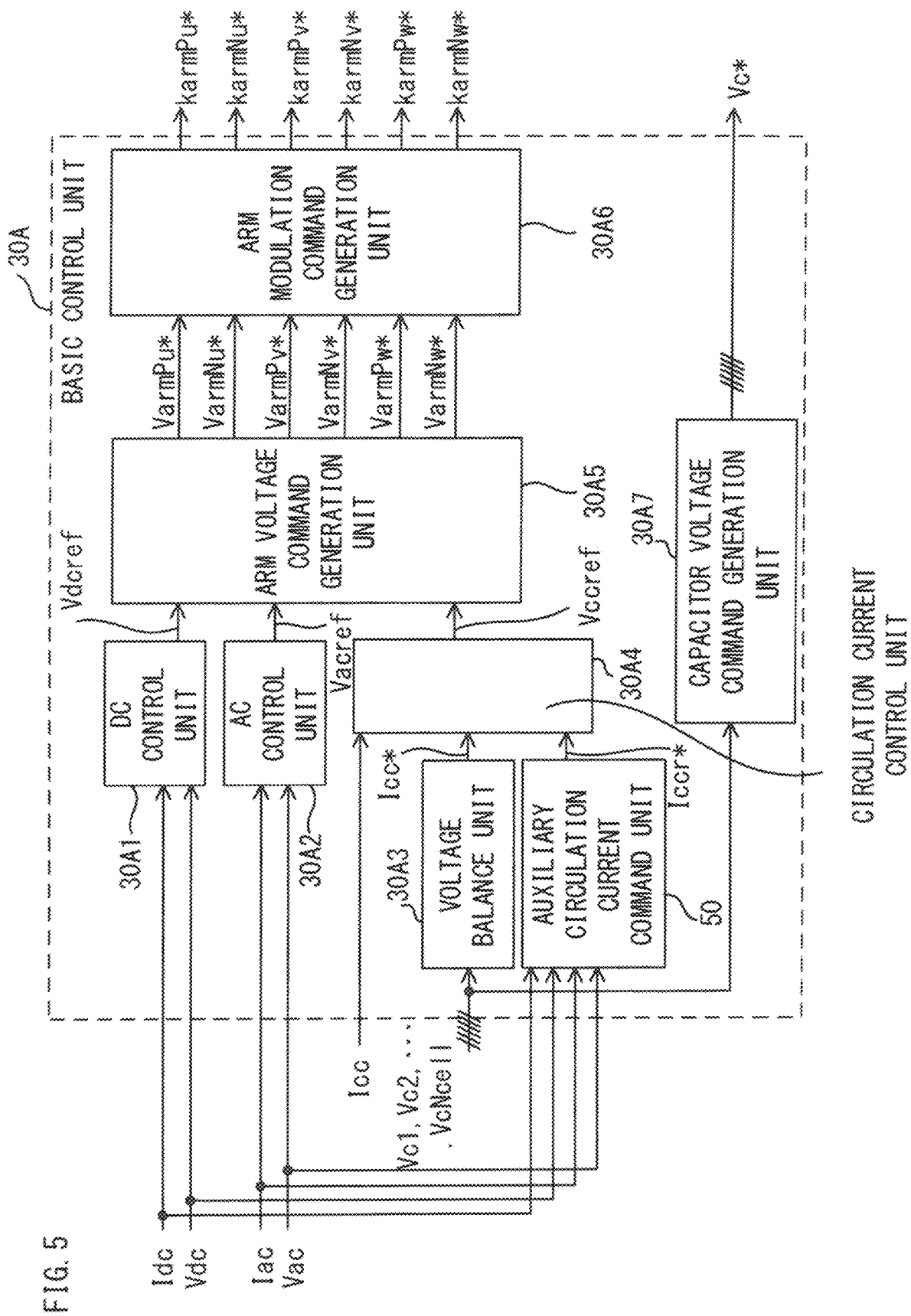
FIG. 5 snows the internal configuration of a basic control unit according to embodiment 1.

FIG. 5 shows the internal configuration of the basic control unit 30A according to embodiment 1.

Figure 6:
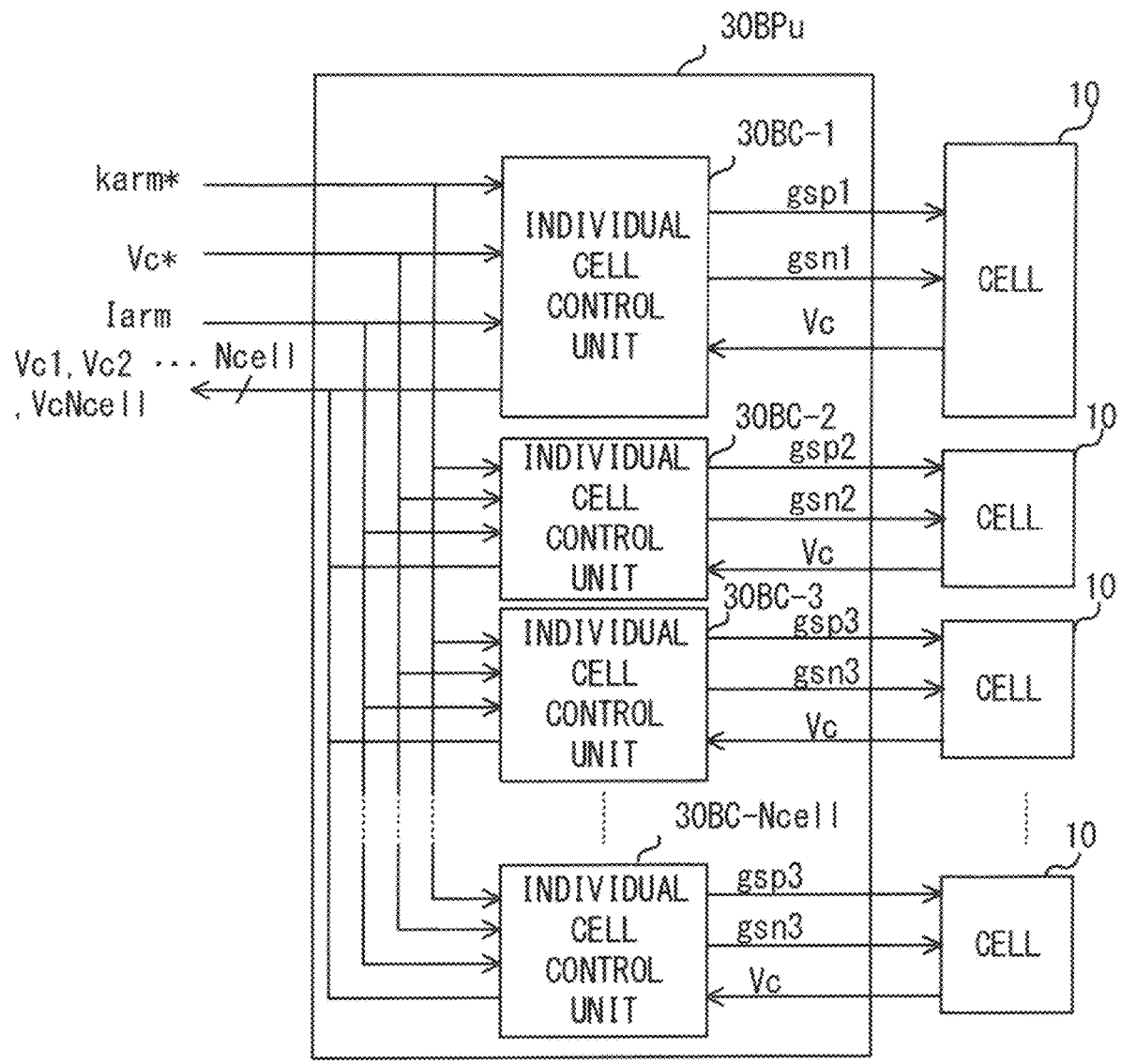
FIG. 6 shows the internal configuration of an arm control unit according to embodiment 1.

FIG. 6 shows the internal configuration of the V-phase upper arm control unit 30BPu for controlling the arm 20 on the upper side for U phase among the arm control units 30B according to embodiment 1.

First, the basic control unit 30A will be described with reference to FIG. 5.

The basic control unit 30A includes a DC control unit 30A1, an AC control unit 30A2, a voltage balance unit 30A3, an auxiliary circulation current command unit 50, a circulation current control unit 30A4, an arm voltage command generation unit 30A5, an arm modulation command generation unit 30A6, and a capacitor voltage command generation unit 30A7. Hereinafter, each of these units will be described.

The DC control unit 30A1 receives the DC voltage Vdc which is voltage between the DC voltage detectors 6P, 6N and the DC current Idc flowing on the DC circuit side through the positive DC terminal 5P.

As described above, the DC voltage Vdc is derived from a difference between the DC voltage VdcP and the DC voltage VdcN respectively detected by the DC voltage detectors 6P, 6N.

The DC current Idc is derived from the arm currents Iarm (IPu, IPv, IPw, INu, INv, INw) detected by the arm current detectors 8P, 8N, as shown by Expression (1) described later.

The DC control unit 30A1 generates a DC voltage command value Vdcref for controlling the DC voltage Vdc, on the basis of the received DC voltage Vdc and DC current Idc.

The AC control unit 30A2 receives the AC voltages Vac detected by the AC voltage detector 9A and the AC currents Iac detected by the AC current detector 9B.

The AC control unit 30A2 generates AC voltage command values Vacrefu, Vacrefv, Vacrefw for controlling the AC voltages Vac for U phase, V phase, and W phase, on the basis of the received AC voltages Vac and AC currents Iac.

When the AC voltage command values Vacrefu, Vacrefv, Vacrefw for the respective phases are collectively mentioned, they are referred to as AC voltage command values Vacref.

The voltage balance unit 30A-3 generates circulation current command values Icc* (Iccu*, Iccv*, Iccw*) for circulation currents Icc caused to flow in order to eliminate imbalance of the voltage sums of the capacitors 12 in the respective arms 20. Circulation current Icc is current circulating among the leg circuits 25 in the power converter 1 without flowing to either of the DC circuit connected to the positive DC terminal 5P and the negative DC terminal 5N of the power converter 1 or the AC circuit connected to the AC input/output terminals 7 of the power converter 1.

In generation of the circulation current command value Icc*, for example, the voltage balance unit 30A3 adjusts the circulation current command value Icc* so that circulation current Icc* having a set magnitude flows with the DC current Idc, to control the switching elements 11, thereby performing control so that the integral value of power inputted/outputted to/from the capacitors 12 becomes zero in one cycle of the AC grid. Thus, imbalance of the voltages Vdc of the capacitors 12 in the respective arms 20 is eliminated.

The auxiliary circulation current command unit 50 calculates auxiliary circulation current command values Iccr* (Iccru*, Iccrv*, Iccrw*) for reducing voltage ripple which is pulsation occurring on the voltage sums of the capacitors 12 in the respective arms 20. The details of the auxiliary circulation current command values Iccr* will be described later.

The circulation current control unit 30A4 receives the circulation currents Icc (Iccu, Iccv, Iccw) for U phase, V phase, and W phase, the circulation current command values Icc* (Iccu*, Iccv*, Iccw*) from the voltage balance unit 30A3, and the auxiliary circulation current command values Iccr* (Iccru*, Iccrv*, Iccrw*) from the auxiliary circulation current command unit 50.

The circulation currents Icc are derived from the arm currents Iarm (IPu, IPv, IPw, INu, INv, INw) detected by the arm current detectors 8P, 8N, as shown by Expression (2) described later.

Then, the circulation current control unit 30A4 generates circulation voltage command values Vccref (Vccrefu, Vccrefv, Vccrefw) for controlling circulation currents for U phase, V phase, and W phase so that each derived circulation current Icc follows the sum of the circulation current command values Icc* and Iccr*.

Here, regarding the circulation currents Icc, for example, the U-phase circulation current Iccu can be calculated together with the DC current Idc, as shown by the following Expressions (1) and (2).

[Mathematical 1]

$$Idc = (IPu + IPv + IPw + INu + INv + INw)/2 \quad (1)$$

[Mathematical 2]

$$Iccu = (IPu + INu)/2 - Idc/3 \quad (2)$$

The arm voltage command generation unit 30A5 generates arm voltage command values Varm* (VarmPu*, VarmNu*, VarmPv*, VarmNv*, VarmPw*, VarmNw*) for the respective arms 20 on the basis of the voltage command values Vdcref, Vacref, Vccref obtained by the DC control unit 30A1, the AC control unit 30A2, and the circulation current control unit 30A4.

The arm modulation command generation unit 30A6 calculates, for each arm 20, a modulation signal karm* (karmPu*, karmNu*, karmPv*, karmNv*, karmPw*, karmNw*) for each individual converter cell 10 in each arm 21 to output voltage, with respect to the respective arm voltage command values Varm* generated by the arm voltage command generation unit 30A5, and outputs the modulation signal karm*. The modulation signal karm* is calculated by dividing the arm voltage command value Varm* for the corresponding arm 20 by the voltage sum of the capacitors 12 and the number of the converter cells 10 in the arm 20, for example.

The capacitor voltage command generation unit 30A7 generates capacitor voltage command values Vc* to be used in the arm control unit 30B shown in FIG. 4.

The capacitor voltage command value Vc* is, for example, a voltage average value of capacitor voltages Vc1 to VcNcell in one arm (VcNcell denotes Ncell-th capacitor voltage, Ncell denotes the number of converter cells included in the arm).

Next, the arm control unit 30B will be described with reference to FIG. 6.

As described above, the U-phase upper arm control unit 30BPu controls the arm 20 on the upper side for U phase. The U-phase upper arm control unit 30BPu includes individual cell control units 30BC (30BC-1, 30BC-2, 30BC-3, . . . , 30BC-Ncell) respectively corresponding to a plurality of (Ncell) converter cells 10 included in the corresponding arm 20 on the upper side for U phase.

The individual cell control unit 30BC-1 adds a voltage variation amount in cortol for suppressing variations in the capacitor voltages Vdc of the converter cells 10 in the arm 20 on the upper side for U phase, to the modulation command karmPu* for the arm 20 on the upper side for U phase sent from the basic control unit 30A. The control for suppressing variations by the individual cell control unit 30BC-1 is, for example, proportional control for determining the voltage variation amount for causing the capacitor voltage value Vc of the corresponding converter cell 10 to follow the capacities voltage command value Vc* (VcPu*) outputted from the capacitor voltage command generation unit 30A7.

Then, each individual cell control unit 30BC generates a gate signal gsp (gsp1, gsp2, gsp3, . . . , gspncell) for the switching element 11p on the upper side and a gate signal gsn (gsn1, gsn2, gsn3, . . . , gsnncell) for the switching element on the lower side in the half-bridge configuration in FIG. 2, by means such as PWM.

Next, the configuration of the auxiliary circulation current command unit 50 included in the basic control unit 30A shown in FIG. 5 will be described with reference to FIG. 7.

Figure 7:
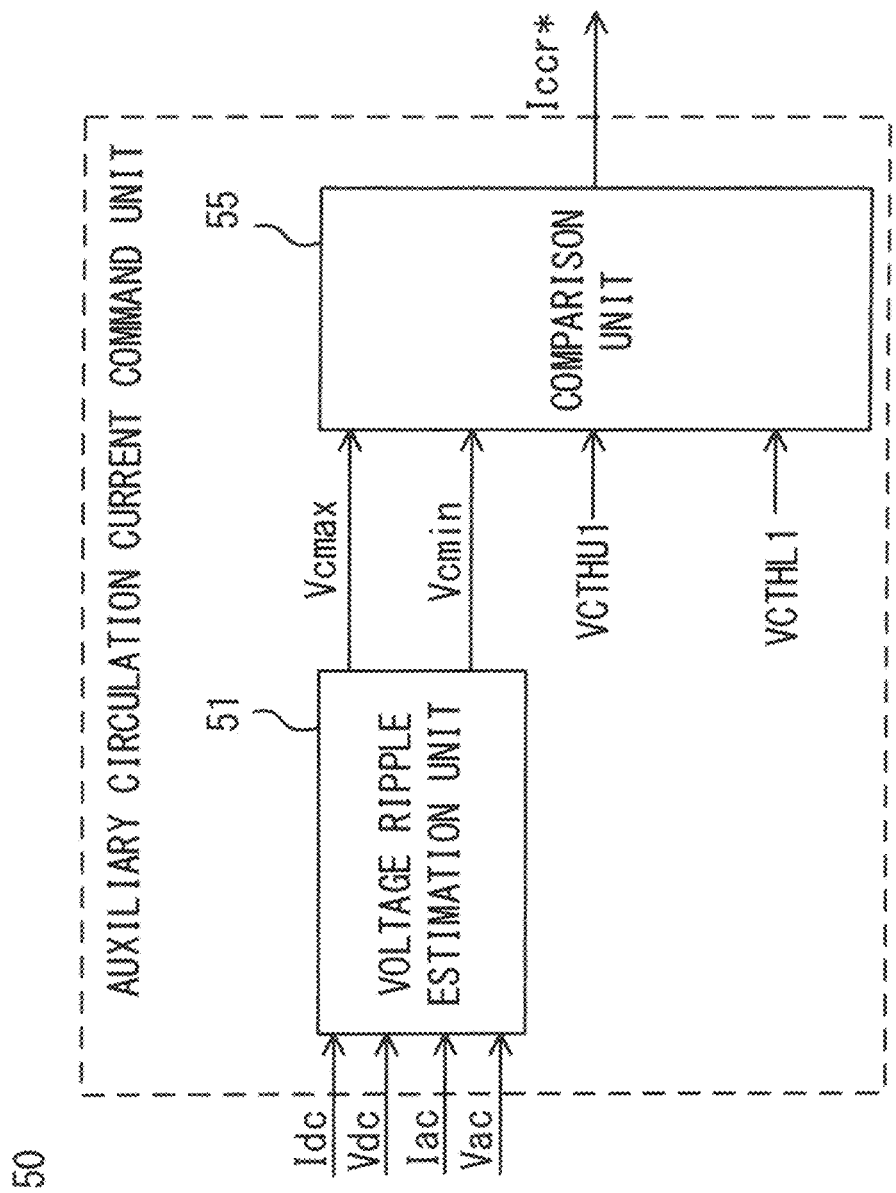
FIG. 7 shows the configuration of an auxiliary circulation current command unit according to embodiment 1.

FIG. 7 shows the configuration of the auxiliary circulation current command unit 50 according to embodiment 1.

The auxiliary circulation current command unit 50 includes a voltage ripple estimation unit 51 and a comparison unit 55.

As described below, the voltage ripple estimation unit 51 estimates voltage ripple of the capacitor voltage value Vc from active power and reactive power flowing through the power converter 1.

In the present embodiment, it is assumed that the AC voltages Vac of the three-phase AC circuit 2 are in a three-phase balanced state, and AC voltages at the AC input/output terminals (7u, 7v, 7w) of the power converter 1 are denoted by Vacsu, Vacsv, Vacsw (collectively denoted by Vacs, phase voltage peak value Vacsp).

In addition, a DC component of the voltage Varm outputted from the arm 20 is denoted by Varmdc, the peak value of an AC component thereof is denoted by Varmac, and the angular frequency of the AC component is denoted by $\omega$. In this case, the voltage Varm outputted from the arm 20 is represented by the flowing Expression (3).

[Mathematical 3]

$$Varm = Varmdc + Varmac \sin \omega t \quad (3)$$

Similarly, a Dc component of current flowing through the arm 20 is denoted by Iarmdc, the peak value of an AC component thereof is denoted by Iarmac, and a power factor angle with respect to the fundamental component of the AC voltage Vac is denoted by $\varphi pf$. In this case, the current Iarm flowing through the arm 20 is represented by the following Expression (4).

[Mathematical 4]

$$Iarm = Iarmdc + Iarmac \sin(\omega_t + \varphi pf) \quad (4)$$

Here, it is assumed that the circulation current Icc is AC current oscillating with a frequency that is an even multiple other than a multiple of 3 with respect to the fundamental component of the AC voltage Vac, and having a peak value Iz and a phase difference $\theta z$ relative to the AC voltage Vacs. That is, in a case where the circulation current Icc is controlled to contain an AC component oscillating with a frequency that is two times the fundamental component, the circulation current Icc is represented by the following Expression (5).

[Mathematical 5]

$$Icc = Iz \cos(2\omega t + \theta cc) \quad (5)$$

At this time, instantaneous power Parm flowing into the arm 20 is represented by the following Expression (6).

[Mathematical 6]

$$Parm = Varmac\ Iarmdc \sin \omega t + Varmdc\ Iarmac \sin(\omega t + \varphi pf) - \frac{Varmac\ Iz}{2} \sin(\omega t + \theta cc) - \frac{Varmac\ Iarmdc}{2} \cos(2\omega t + \varphi pf) + Varmdc\ Iz \cos(2\omega t + \theta cc) + \frac{Varmac\ Iz}{2} \sin(3\omega t + \theta cc) \quad (6)$$

Therefore, a variation amount $\Delta$Warm of energy stored in the arm. 20 is represented by the following Expression (7).

[Mathematical 7]

$$\Delta Warm = \frac{1}{\omega} \Big( -Varmac\ Iarmdc \cos \omega t - Varmdc\ Iarmac \cos(\omega t + \varphi pf) + \frac{Varmac\ Iz}{2} \cos(\omega t + \theta cc) - \frac{Varmac\ Iarmac}{4} \sin(2\omega t + \varphi pf) + \frac{Varmdc\ Iz}{2} \sin(2\omega t + \theta cc) - \frac{Varmac\ Iz}{6} \cos(3\omega t + \theta cc) \Big) \quad (7)$$

In the above variation amount $\Delta$Warm of energy, the fundamental component of the AC voltage Vac is dominant. Therefore, an energy variation amount $\Delta$Warm1f corresponding to only the fundamental component is considered and this can be represented by the following Expression (8).

[Mathematical 8]

$$\Delta Warm1f = \frac{1}{\omega}\Big(-A \cos(\omega t + \varphi) + \frac{Varmac\ Iz}{2} \cos(\omega t + \theta cc)\Big) \quad (8)$$

Here, A and $\varphi$ are respectively represented by the following Expressions (9) and (10).

[Mathematical 9]

$$A = \sqrt{(Varmac\ Iarmdc + Varmdc\ Iarmac \cos \varphi pf)^2 + (Varmdc\ Iarmac \sin \varphi pf)^2} \quad (9)$$

[Mathematical 10]

$$\varphi = \tan^{-1} \frac{Varmdc\ Iarmac \sin \varphi pf}{Varmac\ Iarmdc + Varmdc\ Iarmac \cos \varphi pf} \quad (10)$$

Here, Varmdc, Varmac, Iarmdc, Iarmac are represented as follows.

Varmdc=Vdc/2
Varmac=Vacsp
Iarmdc=Idc/3
Iarmac=Iacp/2

It addition, Iacp is the peak value of line current of the AC current Iac.

With reference to the above Expression (8), it is found that, it the circulation current Icc having a phase and an amplitude respectively set as $\theta cc = \varphi$ and $-A = VarmIz/2$ is caused to flow, the circulation current Icc having the greatest effect to cancel out the energy variation amount $\Delta$Warm1f (voltage ripple amount) of the fundamental component which is the greatest factor for increasing voltage ripple of the capacitor 12, can be caused to flow, whereby capacitor voltage ripple can be reduced.

However, if control is performed such that the circulation current Iz having the greatest effect to cancel out capacitor voltage ripple as described above flows constantly, the effective value of current flowing through each arm 20 in the power converter 1 increases, leading to increase in power loss.

Here, when the circulation current Icc does not flow, the maximum value of the energy variation amount ΔWarm1f in one cycle of the AC grid voltage Vac is A, and the minimum value thereof is −A. Then, the capacitor voltage corresponding to the maximum value A is denoted by VCMAX, and the capacitor voltage corresponding to the minimum value −A is denoted by VCMIN. In addition, a predetermined threshold range determined by rated voltages of elements such as semiconductor elements composing the power converter 1, dielectric withstand voltages thereof, minimum operation voltage of the control device 30, or the like, is defined as a first threshold range VCTH1 (upper limit value VCTHU1, lower limit value VCTHL1).

In this case, if VCMAX<VCTHU1 and VCMIN>VCTHL1 are satisfied, operation as a converter can be performed with no problems. That is, in a state in which circulation current containing an AC component having a frequency that is an even multiple other than a multiple of 3 with respect to the frequency of the fundamental component of AC does not flow, if VCMAX<VCTHU3 and VCMIN>VCTHL1 are satisfied, the circulation current need not be caused to flow.

Here, the above Iarmdc, Iarmac, and φpf are determined by active power and reactive power flowing through the power converter 1. Basically, the power converter 1 used for high voltage direct current (HVDC), BTB, or the like are likely to have fewer opportunities of outputting active power and reactive power at the maximum level. As the active power and the reactive power become smaller, the capacitor voltage ripple becomes smaller. Therefore, in a state in which the active power and the reactive power are small, the disadvantage that loss increases due to circulation current Icc containing an AC component having a frequency that is an ever multiple is greater than the advantage of reducing voltage ripple. Accordingly, the control device 30 in the present embodiment determines whether or not to cause the circulation current Icc for reducing voltage ripple of the capacitor 12 to flow, by performing control described below.

The voltage ripple estimation unit 51 in the present embodiment calculates the energy variation amount ΔWarm1f in each arm 20 from the active power and the reactive power flowing through the power converter 1, as shown by the above Expressions (1) to (10). The energy variation amount ΔWarm1f is associated with voltage ripple of each capacitor 12, and the voltage ripple of the capacitor 12 can be estimated by calculating the energy variation amount ΔWarm1f.

As shown in FIG. 7, a maximum value Vcmax and a minimum value Vcmin of the peak of voltage ripple of the capacitor 12 estimated by the voltage ripple estimation unit 51 are outputted to a comparison unit 55.

The comparison unit 55 compares the estimated maximum value Vcmax and minimum value Vcmin of the capacitor voltage ripple with the above first threshold range VCTH1 (upper simit value VCTHU1, lower limit value VCTHL1). In a case where the maximum value Vcmax and the minimum value Vcmin of voltage ripple of the capacitor 12 exceed the first threshold range VCTH1, the comparison unit 55 determines to make active a first control mode for controlling the circulation current Icc so as to contain an AC component having a frequency that is an even multiple other than a multiple of 3 with respect to the AC voltage fundamental component.

In this case, the comparison unit 55 generates the auxiliary circulation current command value Iccr* for performing command so that the circulation current Icc contains the AC component with a phase set as θcc=φ (first phase θcc1) in the above Expression (6) derived on the basis of active power and reactive power of the power converter 1.

The generated auxiliary circulation current command value Iccr* is inputted to the circulation current control unit 30A4, as shown in FIG. 5. The circulation current control unit 30A4 generates the circulation voltage command value Vccref so that the circulation current Icc follows the sum of the circulation current command value Icc* and the auxiliary circulation current command value Iccr*.

Thus, only in a case where the voltage ripple of the capacitor 12 exceeds rated voltages of elements such as semiconductor elements composing the power converter 1, dielectric withstand voltages thereof, minimum operation voltage of the control device 30, or the like, the ripple reducing circulation current Iccr winch is the circulation current Icc having an AC component with a phase set as θcc-φ (first phase θcc1) capable of efficiently canceling out the energy variation amount ΔWarm1f, can be caused to flow. In this way, control is performed so that voltage ripple of the capacitor 12 falls within the first threshold range VCTH1.

Here, if the purpose is only to reduce voltage ripple of the capacitor voltage value Vc, the circulation current Icc for winch not only the phase θcc of the AC component that the circulation current Icc contains is set to φ (first phase θcc1) but also the amplitude is set such that A in the above Expression (8) is VarmacIz/2, for example, may be caused to flow, whereby the energy variation amount ΔWarm1f can be made closest to zero and the voltage ripple can be maximally reduced. However, when the circulation current Icc having such an amplitude flows, the effective value of current increases so that loss occurring in the switching element 11 or the like increases.

Therefore, in order to reduce loss in the power converter 1 and reduce voltage ripple of the capacitor voltage value Vc, the control device 30 adjusts the amplitude of the AC component that the circulation current Icc contains in the first control mode so that the voltage value of the capacitor voltage value Vc when the first control mode is executed falls within the first threshold range VCTH1 and power loss of the power converter 1 when the first control mode is executed falls within a set permissible range.

As described above, the control device 30 adjusts the amplitude of the AC component that the circulation current Icc contains so as to reduce voltage ripple of the capacitor voltage value Vc without greatly increasing loss of the power converter 1.

In a case where the maximum value Vcmax and the minimum value Vcmin of ripple of the capacitor voltage value Vc falls within the first threshold range VCTH1, the comparison unit 55 makes the auxiliary circulation current command value Iccr* inactive so as to make the first control mode inactive.

In this case, the circulation current control unit 30A4 performs control so that the AC component is not contained in the circulation current Icc caused to flow in the respective phases in order to eliminate imbalance of the voltage sum of the capacitors 12.

As described alcove, in a case where ripple of the capacitor voltage value Vc does not exceed rated voltages of elements such as semiconductor elements composing the power converter 1, dielectric withstand voltages thereof, minimum operation voltage of the control device 30, or the like, the AC component is not contained in the circulation current Icc. Thus, increase in power loss due to the AC component contained in the circulation current Ice can be suppressed.

The first threshold range VCTH1 may be a value corresponding to the sum of the capacitor voltages Vc in each arm 20 or a value corresponding to the average value thereof.

The power conversion device of the present embodiment configured as described above includes:
a power converter which performs power conversion between plural-phase AC and DC and includes, for the respective phases of the AC, leg circuits each having a pair of arms connected in series to each other, each arm including a plurality of converter cells which are connected in series and each of which includes an energy storage element and a plurality of semiconductor elements, the leg circuits being connected in parallel between positive and negative DC terminals; and
a control unit which controls the power converter, wherein
the control unit has a first control mode for controlling circulation current circulating among th leg circuits for the respective phases in the power converter so that an AC component having a frequency that is an even multiple other than a multiple of 3 with respect to a frequency of a fundamental component of the AC is contained in the circulation current, and
the control unit determines whether to make the first control mode active or inactive, on the basis of a voltage value of the energy storage element.

In general, in a multilevel converter including a plurality of converter cells each including an energy storage element and connected in series, power pulsation occurs in each arm in one cycle of the fundamental component.

The control unit in the present embodiment has the first control mode for controlling circulation current circulating among the leg circuits for the respective phases so that an AC component having a frequency that is an even multiple other than a multiple of 3 with respect to the frequency of the fundamental component of the AC is contained in the circulation current. Further, the control unit determines whether to make the first control mode active or inactive, on the basis of the voltage value of the energy storage element.

In this way, it is possible to switch the first control of containing the even-multiple AC component in the circulation current between active and inactive on the basis of the voltage value of the energy storage element.

Thus, for example, in a case where the power converter is operated in a state in winch active power and reactive power are small so that voltage ripple of the energy storage element is small and the voltage ripple need not be reduced, the first control mode can be made inactive. In this way, only when reduction of voltage ripple is needed, the first control mode for causing circulation current for reducing the voltage ripple to flow can be made active, so that loss increase due to current increase can be suppressed to the minimum level. Thus, it is possible to reduce voltage pulsation of the capacitor without greatly increasing loss in the power converter.

In the power conversion device of the present embodiment configured as described above,
when the voltage value of the energy storage element exceeds a set first threshold range, the control unit determines to make the first control mode active and executes the first control mode, and
the first threshold range is set to not greater than rated voltage of the energy storage element.

As described above, the control unit compares the voltage value of the energy storage element with the set first threshold range, and only in a case of exceeding the first threshold range, the control unit makes the first control mode active.

Then, the first threshold range is at least set to not greater than the rated voltage of the energy storage element.

For example, even in a case where voltage ripple of the energy storage element is not greater than the rated voltage thereof, if loss when the first control mode for reducing the voltage ripple is executed is permissible, the first control rode may be executed in consideration of the fact that it takes time until circulation current flows due to delay of response of control or the like, for example.

As described above, the first threshold is set in accordance with necessity of reducing voltage ripple, and power loss when control for reducing voltage ripple is executed. Thus, it is possible to reduce voltage pulsation of the capacitor while assuredly suppressing great increase of loss in the power converter.

The first threshold may be set in accordance with loss estimated to occur when the first control mode is executed.

In the power conversion device of the present embodiment configured as described above,
the control unit adjusts a phase of the AC component that the circulation current contains in the first control mode, to a first phase, so that the voltage value of the energy storage element when the first control mode is executed falls within the first threshold range.

As described above, by adjusting the phase of the AC component that the circulation current contains to the first phase so that the voltage value of the energy storage element falls within the first threshold range, circulation current having the greatest effect to cancel out the voltage ripple can be caused to flow. Thus, it is possible to efficiently suppress loss increase due to current increase to the minimum level while suppressing flow of excessive circulation current.

In the power conversion device of the present embodiment configured as described above,
the control unit adjusts an amplitude of the AC component that the circulation current contains in the first control mode so that the voltage value of the energy storage element when the first control mode is executed falls within the first threshold range.

As describe above, by adjusting the amplitude of the AC component that the circulation current contains when the first control node is executed, it is possible to suppress loss increase due to the AC component that the circulation current contains at time of execution of the first control mode, for example.

In the power conversion device of the present embodiment configured as described above,
a phase of the AC component to be adjusted by the control unit at time of execution of the first control mode is determined on the basis of an energy variation amount of the energy storage element derived from active power and reactive power of the power converter.

As described above, as the energy variation amount of the energy storage element, an estimated value derived from active power and reactive power of the power converter is used, whereby immediate and accurate control can be performed.

Embodiment 2

Hereinafter, embodiment 2 of the present disclosure will be described with reference to the drawings, focusing on difference from the above embodiment 1. The same parts as those in the above embodiment 1 are denoted by the same reference characters and the description thereof is omitted.

In embodiment 1, under the assumption that the AC voltages Vac are in a three-phase balanced state, the energy variation amount ΔWarm1f is derived from active power and reactive power flowing through the power converter 1, whereby voltage ripple of the capacitor voltage value Vc is estimated. Then, whether to make the first control active or inactive is determined in accordance with whether or not the estimated value of the pulsating reactor voltage value Vc exceeds the first threshold range VCTH1.

However, when the AC voltages Vac are in a three-phase balanced state, the magnitude of voltage ripple of the capacitor voltage value Vc in each arm 20 is equal among the arms 20. However, if negative-phase-sequence voltage, harmonic voltage, or the like is superimposed, the magnitude of voltage ripple might differ among the arms 20, and further, might change over time.

In embodiment 2, considering such cases, the capacitor voltage values Vc are actually detected by the voltage detectors 15 provided to the respective converter cells 10, and then are summed for each arm 20. Then, the detected capacitor voltage value VcarmPu, VcarmNu, VcarmPv, VcarmNv, VcarmPw, VcarmNw for each arm 20 is compared with the first threshold range VCTH1 (upper limit value VCTHU, lower limit value VCTHL), thereby determining whether to make the first control active or inactive.

Figure 8:
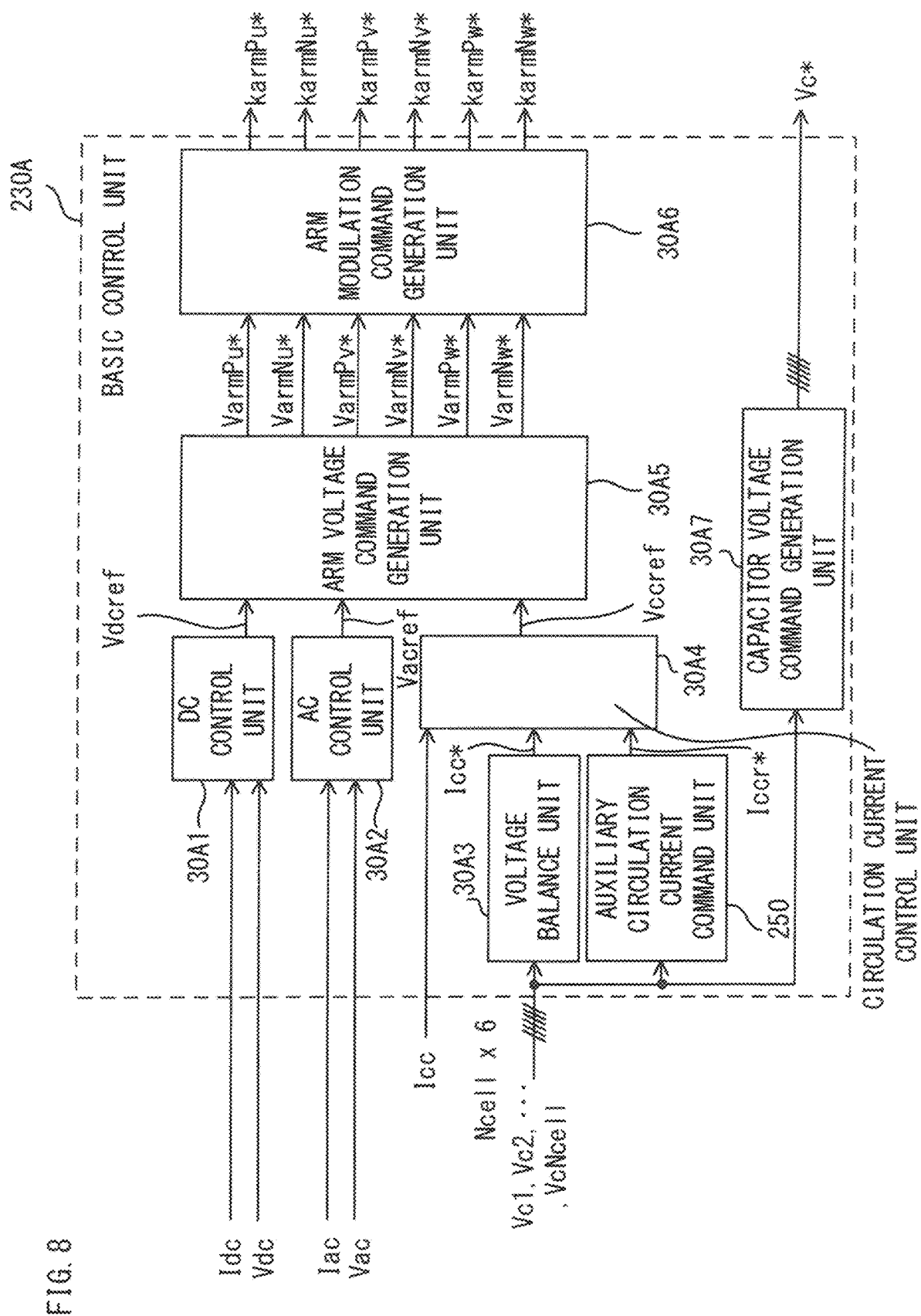
FIG. 8 shows the internal configuration of a basic control unit according to embodiment 2.

FIG. 8 shows the internal configuration of a basic control unit 230A according to embodiment 2.

Figure 9:
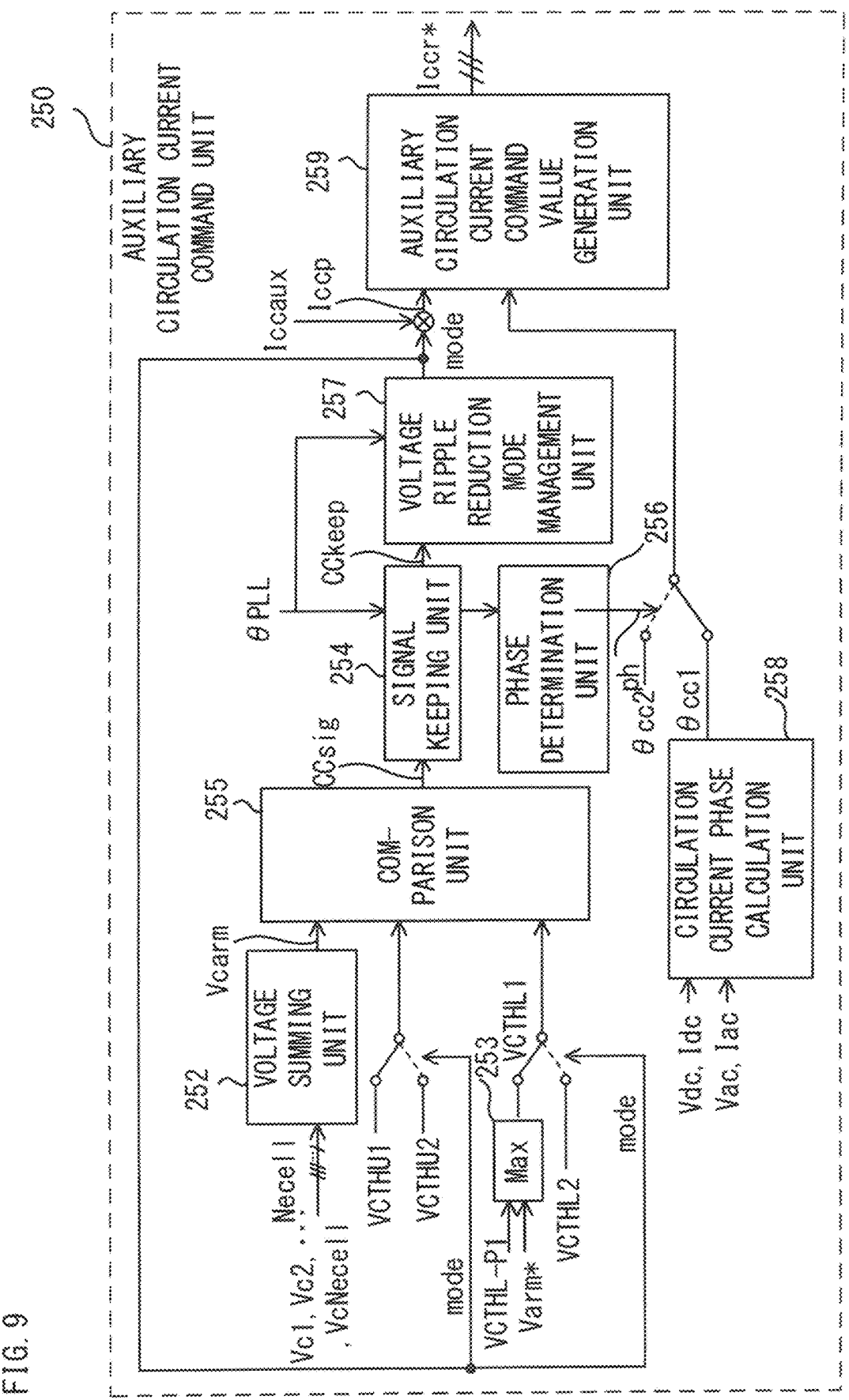
FIG. 9 shows the configuration of an auxiliary circulation current command unit according to embodiment 2.

FIG. 9 shows the configuration of an auxiliary circulation current command unit 250 shown in FIG. 8.

As shown in FIG. 8, unlike the basic control unit 30A in embodiment 1, the auxiliary circulation current command unit 250 included in the basic control unit 230A in the present embodiment does not receive the DC current Idc, the DC voltage Vdc, the AC current Iac, and the AC voltage Vac for estimating voltage of the capacitor voltage value Vc from active power and reactive power flowing through the power converter 1, and receives the capacitor voltage values Vc (Vc1, Vc2, ..., VcNcell) of the capacitors 32 detected by the voltage detectors 15.

As shown in FIG. 9, the auxiliary circulation current command unit 250 includes a voltage summing unit 252, a threshold selection unit 253, a comparison unit 255, a signal keeping unit 254, a phase determination unit 256, a voltage ripple reduction mode management unit 257, a circulation current phase calculation unit 256, and an auxillary circulation current command value generation unit 259. Operation of each unit will be described below with reference to FIG. 10.

As the detected values of the capacitor voltage values Vc to be inputted to the auxiliary circulation current command unit 250, the average value of the detected values of the capacitor voltage values Vc in each arm 20 or a value corresponding thereto may be used. In the present embodiment, for the purpose of simplification, a case of using the sums VcarmPu, VcarmNu, VcarmPv, VcarmNv, VcarmPw, VcarmNw of the capacitor voltage values Vc in the respective arms 20 (referred to as Vcarm in a case of mentioning the sum of the capacitor voltage values Vc in one arm 20 as a representative) will be described.

Figure 10:
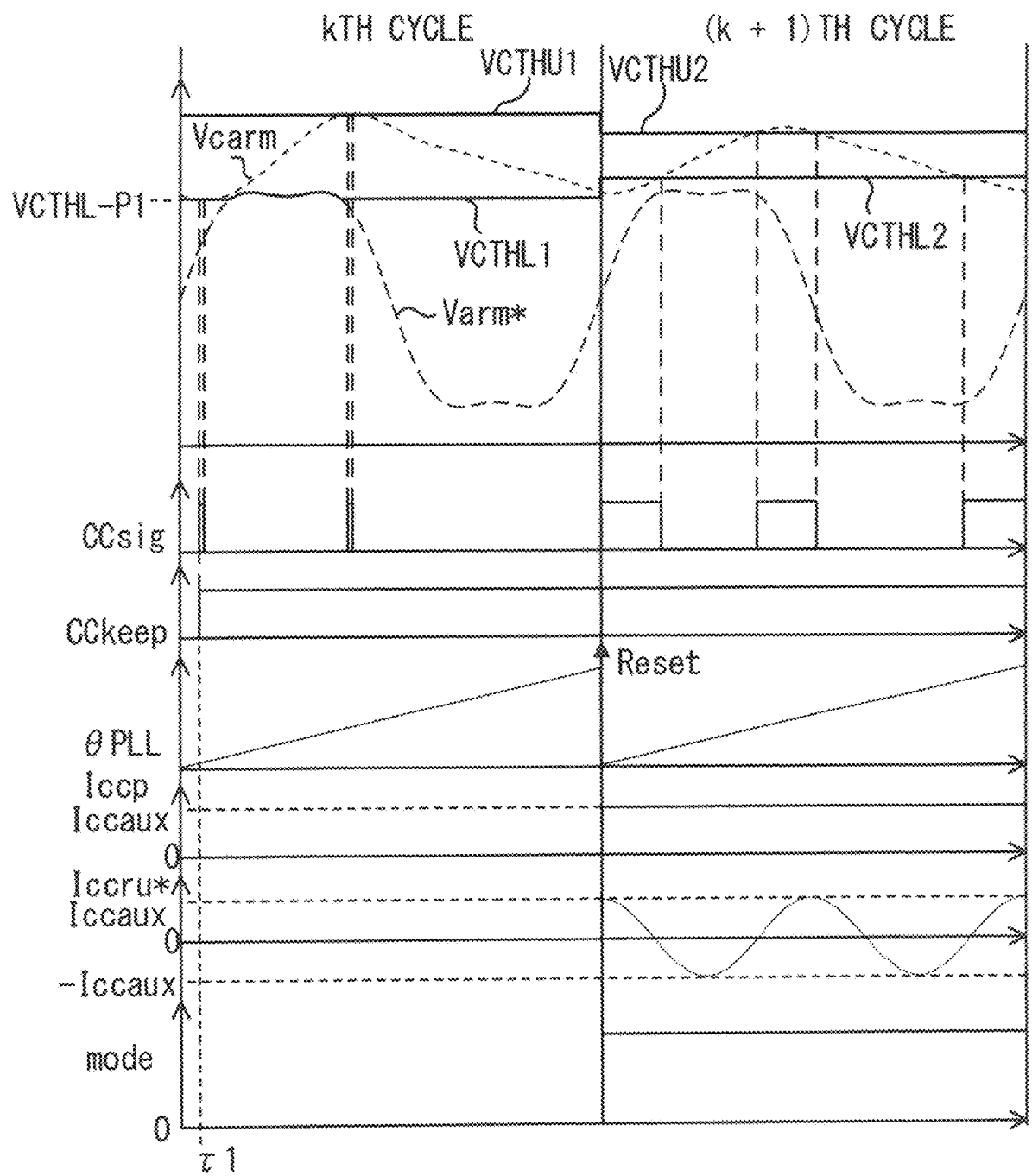
FIG. 10 illustrates operation of the auxiliary circulation current command unit according to embodiment 2.

FIG. 10 illustrates operation of the auxiliary circulation current command unit 250 according to embodiment 2. In FIG. 10, a kth cycle of the fundamental component of AC and a (k+1)th cycle that is one cycle after the kth cycle, are shown. For simplifying the drawing, only the waveform in one arm 20 for U phase is shown among the plurality of arms 20 included in the power converter 1.

First, regarding the first threshold range VCTH1 used in the present embodiment, the lower limit value VCTHL1 is adjusted at every phase by the threshold selection unit 253 so that the lower limit value VCTHL1 at every phase becomes the greater one of a first value VCTHL1 which is a predetermined constant value and the arm voltage command value Varm*. Therefore, as shown in the kth cycle in FIG. 10, at every phase, the lower limit value VCTHL1 of the first threshold range VCTH1 changes so as to become the same value as the arm voltage command value Varm* at a phase around the upper peak of the arm voltage command value Varm*.

(kth cycle)

The voltage summing unit 252 outputs the sum of the capacitor voltage values Vc in the arm 20 as an arm capacitor voltage sum Vcarm. The outputted arm capacitor voltage sum Vcarm is inputted to the comparison unit 255.

The comparison unit 255 compares the arm capacitor voltage sum Vcarm with the set first threshold range VCTH1.

In a care where Vcarm>VCTHU1 or Vcarm<VCTHL1 is satisfied, i.e., the arm capacitor voltage sum Vcarm exceeds the first threshold range VCTH1, the comparison unit 255 outputs 1 as a signal CCsiq.

In a case where the arm capacitor voltage sum Vcarm is not greater than the first threshold range VCTH1, the comparison unit 255 outputs 0 as the signal CCsig.

The signal keeping unit 254 receives the signal CCsig outputted from the comparison unit 255 and phase information θPLL indicating the phase of the AC voltage Vac obtained from the AC grid.

The phase information θPLL in the present embodiment is defined such that θPLL is 0 when the fundamental component of the grid voltage for U phase becomes positive from negative.

As shown in FIG. 10, at a phase τ1, the arm capacitor voltage sum Vcarm is lower than the lower limit value VCTHL1 of the first threshold range VCTH1, so that the signal CCsig is 1. This signal CCsig is inputted to the signal keeping unit 254, and at the same time, a kept signal CCkeep in the signal keeping unit 254 becomes 1. Thereafter, even if the kept signal CCsig becomes 0, CCkeep is kept at 1 until θPLL becomes 0.

When the phase information θPLL becomes 0, i.e., the kth cycle of the AC voltage Vac has passed, the signal keeping unit 254 resets the kept signal CCkeep to 0, and outputs the value of the kept signal CCkeep just before the reset, to the voltage ripple reduction mode management unit 527.

Since reset of the kept signal CCkeep to 0 is instantaneous, a waveform when the kept signal CCkeep is reset is not shown in FIG. 10, for simplifying the drawing.

The voltage ripple reduction mode management unit 257 outputs the kept signal CCkeep as a signal mode during one cycle ((k+1)th cycle) of the fundamental component after the reset.

The outputted signal mode is multiplied by a voltage ripple reducing circulation current peak value Iccaux, and the resultant value is outputted as a signal Iccp. The outputted signal Iccp is inputted to the auxiliary circulation current command value generation unit 259.

The auxiliary circulation current command value generation unit 259 calculates the auxiliary circulation current command value Iccr* for making active the first control of controlling the circulation current Icc so as to contain an AC component having a frequency that is an even multiple other than a multiple of 3 with respect to the AC voltage fundamental component, on the basis of the inputted signal Iccp and the first phase θcc1, of the AC component that the circulation current Icc contains, outputted from the circulation current phase calculation unit 258.

((k+1)th cycle)

The (k+1)th cycle is basically the same as the kth cycle. However, since the signal CCkeep has become 1 in the kth cycle, the signal mode in the (k+1)th cycle is 1, so that the first control becomes active. Then, the ripple reducing circulation current Iccr flows in the (k+1)th cycle, so that voltage ripple of the arm capacitor voltage sum Vcarm is reduced.

Here, for the reduced arm capacitor voltage sum Vcarm, if the first threshold range VCTH1 used when the ripple reducing circulation current Iccr does not flow is used as the threshold in the comparison unit 255, the arm capacitor voltage sum Vcarm does not exceed the first threshold range VCTH1. In this case, the signal mode does not become 1, so that the ripple reducing circulation current Iccr does not flow in the (k+2)th cycle. Then, the capacitor voltage ripple comes back to the original state and thus the first threshold range VCTH1 is exceeded. In response to this, the ripple reducing circulation current flows in the (k+3)th cycle. In this way, the first control is switched between active and inactive on a one-cycle basis. This makes such a situation that the capacitor voltage ripple is reduced or not reduced depending on each cycle of the AC voltage Vac. Therefore, it is necessary to newly set the threshold range in a cycle when the ripple reducing circulation current Iccr containing the AC component flows with the first control made active.

In the present embodiment, on the basis of the signal mode, the threshold range to be used in the comparison unit 255 can be switched between the first threshold range VCTH1 and a second threshold range VCTH2 which is smaller by a set adjustment value than the first threshold range VCTH1. That is, the second threshold range VCTH2 Is set to have an upper limit value VCTHU2 (<VCTHU1) and a lower limit value VCTHL2 (VCTHL1).

Thus, since a period in which Vcarm>VCTHU2 or Vcarm<VCTHL2 is satisfied is present also in the (k+1)th cycle, the signal mode becomes 1 in the (k+1)th cycle, so that the first control mode becomes active also in the (k+2)th and subsequent cycles.

In a case where the capacitor voltage ripple does not exceed the newly set second threshold range VCTH2 in at least one cycle after the (k+1)th cycle when the first control mode is made active, the first control mode is made inactive.

As in embodiment 1, in a case where the AC voltages Vac are in a three-phase balanced state and voltage ripple of the capacitor voltage value Vc is estimated from active power and reactive power flowing through the power converter 1, the estimated voltage ripple is a highly accurate value that is not greatly different from the actual voltage ripple. Therefore, in embodiment 1, after whether to make the first control active or inactive is determined, the determination need not be performed in the subsequent cycles.

In the present embodiment, considering that negative-phase-sequence voltage, harmonic voltage, or the like is superimposed on the capacitor voltage value Vc, the capacitor voltage value Vc is actually detected by the voltage detector 15 provided to each converter cell 10. As described above, in a case of using the actual measured value, the magnitude of the detected voltage ripple of the capacitor 22 might change over time until operation of the power converter 1 is stabilized, for example.

In the present embodiment, on the basis of the voltage ripple of the capacitor 12 which changes over time as described above, whether or not to set the signal mode to 1, i.e., whether to make the first control active or inactive, is determined in each cycle. In this way, whether or not the first control is needed can re determined on the basis of the actual capacitor voltage, whereby it is possible to adapt to various operation patterns of the power converter 1.

In the subsequent cycles from the (k+1)th cycle when the first control mode is made active, the circulation current phase calculation unit 258 may adjust, in each cycle, the phase and the amplitude of the AC component of the circulation current Icc having the greatest effect to cancel out the estimated voltage ripple.

In the present embodiment, the phase of the AC component that the circulation current Icc contains may be adjusted as described below.

Figure 11:
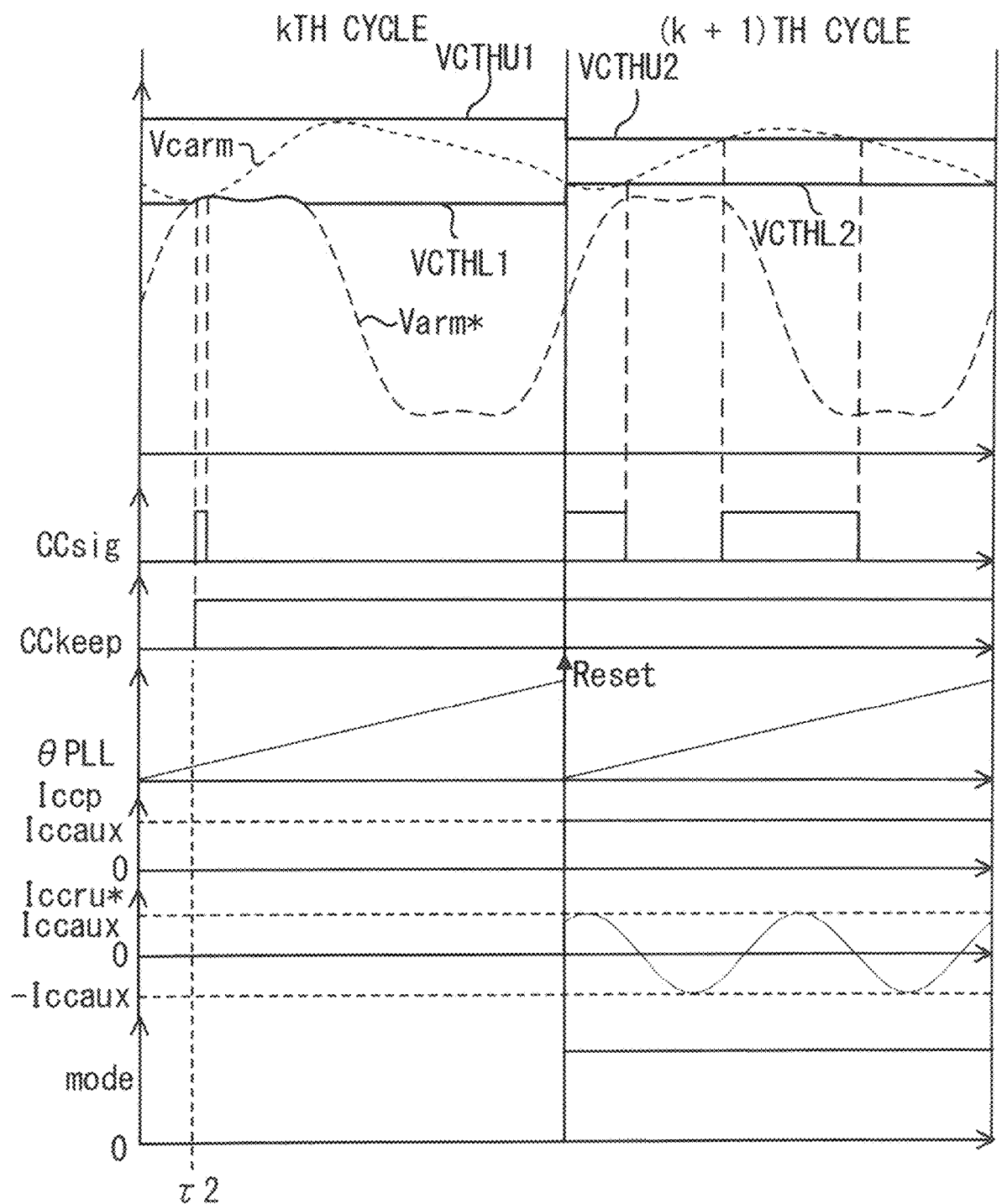
FIG. 11 illustrates operation of the auxiliary circulation current command unit according to embodiment 2.

FIG. 11 illustrates operation of the auxiliary circulation current command unit 250 according to embodiment 2.

The phase determination unit 256 receives the signal CCsig outputted from the signal keeping unit 254 and the threshold VCTHL used in the comparison unit 255. Then, using the signal CCsig and the threshold VCTHL, the phase determination unit 256 outputs a signal ph for determining the phase of the circulation current command value Iccr* to be generated in the auxillary circulation current command value generation unit 259.

For example, when Vcarm<VCTHL1 is satisfied and the value of VCTHL1 at this time is the value of the arm voltage command value Varm*, the phase determination unit 256 sets the signal ph at 1, and otherwise, sets the signal ph at 0. That is, as shown at a phase τ2 in FIG. 11, when the capacitor voltage sum Vcarm in the arm 20 is the same as the arm voltage command value Varm*, 1 is outputted.

When the signal ph outputted from the phase determination unit 206 is 1, the circulation current phase calculation unit 258 sets the phase (second phase θcc2) of the circulation current Icc so that a difference between the arm capacitor voltage sur Vcarm and the arm voltage command value Varm, becomes greatest at the phase τ2 when the arm capacitor voltage su VCarm has become the same as the arm voltage command value Varm*.

The phase τ2 when the arm capacitor voltage sum Vcarm has become the same as the arm voltage command value Varm* is approximately θPLL=π/3, in the example shown in FIG. 11. This is almost the same at arty time as long as the direction of active power is the same, and therefore the value of the second phase θcc2 can be determined in advance. In this part, the second phase θcc2 may be set so that the variation amount ΔWarm of energy shown by Expression (8) in in embodiment 1 increases in the positive direction, e.g., set to a constant value of about −3π/4 to −π/2.

In a case of using such a second phase θcc2 that the variation amount ΔWarm of energy shown by Expression (8) in embodiment 1 increases in the positive direction, the amplitude of the capacitor voltage ripple becomes great depending on the operation state of the power converter 1, so that the arm capacitor voltage sum Vcarm might exceed the arm voltage command value Varm* (first threshold range). In this case, the phase determination unit 256 may output the signal ph for performing command switch the second phase θcc2 to the first phase θcc1 shown by Expression (10) in embodiment 1.

The configuration in which the converter cells 10 included in the arm 20 are each provided with the voltage detector 15, has been shown. In this case, even if difference in the capacitor voltage values Vc occurs in each arm 20 due to negative-phase-sequence voltage, harmonic voltage, or the like, the arm 20 in which there is a possibility of exceeding the first threshold range VCTH1 can be assuredly detected.

However, without limitation thereto, the voltage detector 15 may be provided to at least one of the converter cells 1 included in each arm 20.

Then, the control device 30 may determine whether to make the first control mode active or inactive, on the basis of the capacitor voltage value Vc in at least one arm 20, detected by the voltage detector 15.

Figure 12:
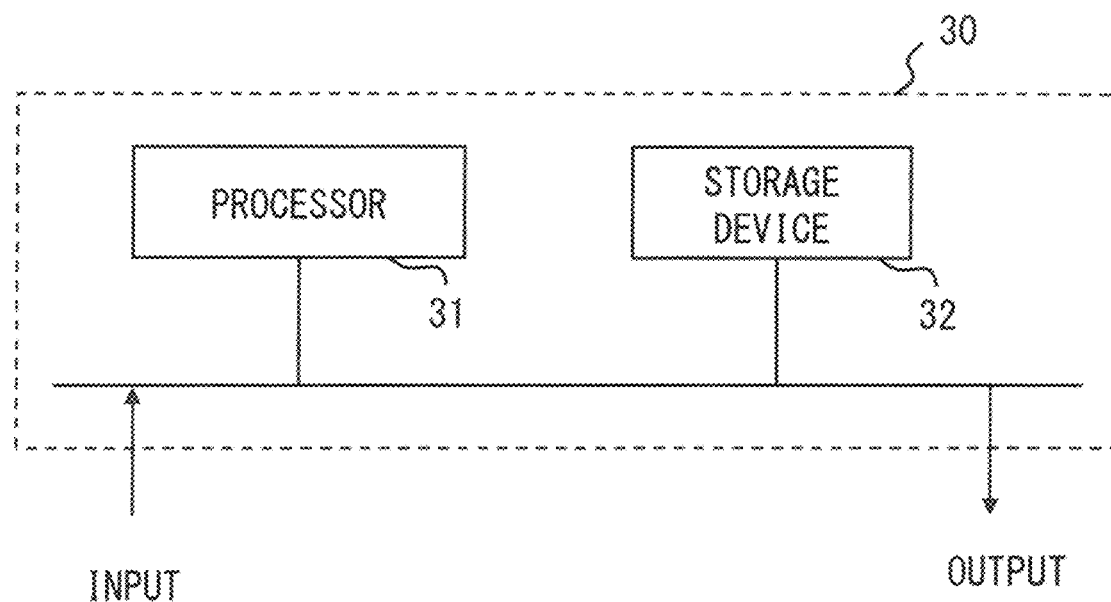
FIG. 12 shows a hardware example of a control device according to embodiment 2.

FIG. 12 shows a hardware example of the control device 30 according to embodiment 2.

The control device 30 is composed of a processor 32 and a storage device 32 as shown in FIG. 12 which shows a hardware example thereof. Although not shown, the storage device is provided with a volatile storage device such as a random access memory and a nonvolatile auxiliary storage device such as a flash memory.

Instead of the flash memory, an auxillary storage device of a hard disk may be provided. The processor 31 executes a program inputted from the storage device 32. In this case, the program is inputted from the auxiliary storage device to the processor 31 via the volatile storage device. The processor 31 may output data such as a calculation result to the volatile storage device of the storage device 32, or may store such data into the auxiliary storage device via the volatile storage device.

In the power conversion device of the present embodiment configured as described above, the control unit adjusts a lower limit value of the first threshold range at every phase so as to be a greater one of a predetermined constant first value and an AC voltage command value for the arm.

As described above, the lower limit value of the first threshold range is adjusted at every phase so as to be the greater one of the constant first value and the arm AC voltage command value. Therefore, for example, if the first value VCTH1-P1 is set at a value smaller than the upper peak value of the arm AC voltage command value, the lower limit value VCTHL1 of the first threshold range becomes the first value VCTHL-P1 smaller than the upper peak, in a region other than the vicinity of the upper peak of the arm AC voltage command value.

Thus, it is not necessary that the lower limit value of the first threshold range is always set to a value greater than the arm AC voltage command value, so that a period in which the first control becomes active is reduced, whereby it is possible to suppress loss Increase without causing unnecessary circulation current to flow.

As described above, the magnitude of voltage ripple might differ in each arm 20 due to negative-phase-sequence voltage, harmonic voltage, or the like, and further, might change over time.

In the present embodiment, as described above, the lower limit value of the first threshold range is set so as to be not always a value greater than the arm AC voltage command value. Therefore, a margin between the voltage ripple and the lower limit value of the first threshold range can be ensured to be great. Thus, even in a case where the magnitude of voltage ripple changes over time, it is possible to prevent such a situation that the first control unnecessarily becomes active and unnecessary circulation current flows.

Such setting for the lower limit value of the first threshold range at every phase is also applicable to the power conversion device in embodiment 1.

In the power conversion device of the present embodiment configured as described above, when a peak value of pulsation of the voltage value of the energy storage element becomes the same as an AC voltage command value for the arm, the control unit adjusts a phase of the AC component that the circulation current contains, to a second phase, so that a magnitude of an energy variation amount of the energy storage element at a phase when the peak value of pulsation of the voltage value of the energy storage element has become the same as the AC voltage command value for the arm increases in a positive direction, in the first control mode.

As described above, the phase of the AC component that the circulation current contains is adjusted to such a second phase that the magnitude of the energy variation amount of the energy storage element at a phase when the lower limit value of the first threshold s exceeded increases in the positive direction, i.e., the capacitor voltage value at a phase when the first threshold and the capacitor voltage become the same increases in the positive direction. Thus, the control margin can be ensured to be great also at a phase when the control margin becomes small. In this way, the circulation current having the AC component with such a phase that the effect is great for voltage ripple of the capacitor is caused to flow, whereby it is possible to suppress loss increase without causing unnecessary circulation current to flow. Further, it is also possible to prevent overmodulation due to the arm voltage command value becoming greater than the capacitor voltage.

In the power conversion device of the present embodiment configured as described above, a second threshold range smaller by a set adjustment value than the first threshold range is provided, in a case where the voltage value of the energy storage element exceeds the first threshold range in a kth cycle of the fundamental component of the plural-phase AC, the control unit executes the first control mode and sets the first threshold range to the second threshold range, in a (k+1)th cycle that is one cycle after the kth cycle, and when the voltage value of the energy storage element exceeds the second threshold range in the (k+1)th cycle at time of execution of the first control mode, the control unit controls the circulation current so that values of a phase and an amplitude of the AC component contained in the circulation current at time of execution of the first control mode in the (k+1)th cycle are kept in a cycle after the (k+1)th cycle.

As described above, the second threshold range smaller ty the set adjustment value than the first threshold range is provided. Then, in a case where the voltage value of the energy storage element exceeds the first threshold range in the kth cycle of the fundamental component of the AC, the first control mode is executed and the new second threshold range is set, in the subsequent (k+1)th cycle. Then, when the voltage value of the energy storage element exceeds the second threshold range in the (k+1)th cycle at time of execution of the first control mode, execution of the first control mode in the (k+1)th cycle is continued also in the (k+2)th cycle subsequent to the (k+1)th cycle. That is, the circulation current is controlled so that the values of the phase and the amplitude of the AC component contained in the circulation current flowing in the (k+1)th cycle are kept subsequently.

Thus, the first control mode becomes active also in the (k+2)th and subsequent cycles, whereby it is possible to prevent chattering in which the first control mode repeatedly becomes active and inactive in every cycle, so that the power conversion device can be stabilized.

In addition, the circulation current Icc having such a phase and an amplitude that have the greatest effect to cancel out the capacitor voltage ripple, determined in the (k+1)th cycle, can be continued to flow also in the (k+2)th and subsequent cycles. Thus, the AC component that the circulation current Icc caused to flow contains can be prevented from being switched every cycle, whereby the power conversion device can be stabilized.

In the power conversion device of the present embodiment configured as described above, at time of execution of the first control mode, in a case where the voltage value of the energy storage element does not exceed the second threshold range in at least one cycle after the (k+3)th cycle of the fundamental component of the plural-phase AC, the control unit makes the first control mode inactive.

As described above, in a case where the energy storage element does not exceed the newly set second threshold range, the first control mode is made inactive, whereby it is possible to suppress increase in loss due to unnecessary circulation current flowing.

In the power conversion device of the present embodiment configured as described above, a voltage detector for detecting the voltage value of the energy storage element is provided to at least one of the converter cells included in each arm, and the control unit determines whether to make the first control mode active or inactive, on the basis of the voltage value of the energy storage element in at least one of the arms, detected by the voltage detector.

As described above, even if difference in capacitor voltages occurs in each arm due to negative-phase-sequence voltage, harmonic voltage, or the like, detection can be performed at the arm part where the condition is severest, and this whether or not the threshold range is exceeded can be determined more accurately.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which nave not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 power converter
10 converter cell
5P positive DC terminal
5N negative CC terminal
12 capacitor (energy storage element)
11$p$, 11$n$, 11$p$1, 11$n$1, 11$p$2, 11$n$2 switching element (semiconductor element)
20, 20Pu, 20Pv, 20Pw, 20Nu, 20Nv, 20Nw arm
25, 25$u$, 25$v$, 25$w$ leg circuit
30 control device (control unit)
100 power conversion device

The invention claimed is:

1. A power conversion device comprising:
a power converter which performs power conversion between plural-phase AC and DC and includes, for the respective phases of the AC, leg circuits each having a pair of arms connected in series to each other, each arm including a plurality of converter cells which are connected in series and each of which includes an energy storage element and a plurality of semiconductor elements, the leg circuits being connected in parallel between positive and negative DC terminals; and
a controlling circuitry which controls the power converter, wherein
the controlling circuitry has a first control mode for controlling circulation current circulating among the leg circuits for the respective phases in the power converter so that an AC component having a frequency that is an even multiple other than a multiple of 3 with respect to a frequency of a fundamental component of the AC is contained in the circulation current, and
the controlling circuitry determines whether to make the first control mode active or inactive, on the basis of a voltage value of at least one of the energy storage elements.

2. The power conversion device according to claim 1, wherein
when the voltage value of the at least one of the energy storage elements exceeds a set first threshold range, the controlling circuitry determines to make the first control mode active and executes the first control mode, and
the first threshold range is set to not greater than rated voltage of at least one of the energy storage elements.

3. The power conversion device according to claim 2, wherein
the controlling circuitry adjusts a lower limit value of the first threshold range at every phase so as to be a greater one of a predetermined constant first value and an AC voltage command value for the arm.

4. The power conversion device according to claim 3, wherein
the controlling circuitry adjusts a phase of the AC component that the circulation current contains in the first control mode, to a first phase, so that the voltage value of the at least one of the energy storage elements when the first control mode is executed falls within the first threshold range.

5. The power conversion device according to claim 4, wherein
the controlling circuitry adjusts an amplitude of the AC component that the circulation current contains in the first control mode so that the voltage value of the at least one of the energy storage elements when the first control mode is executed falls within the first threshold range.

6. The power conversion device according to claim 4, wherein
when a peak value of pulsation of the voltage value of the at least one of the energy storage elements becomes the same as an AC voltage command value for the arm, the controlling circuitry adjusts a phase of the AC component that the circulation current contains, to a second phase, so that a magnitude of an energy variation amount of the at least one of the energy storage elements at a phase when the peak value of pulsation of the voltage value of the at least one of the energy storage elements has become the same as the AC voltage command value for the arm increases in a positive direction, in the first control mode.

7. The power conversion device according to claim 3, wherein
the controlling circuitry adjusts an amplitude of the AC component that the circulation current contains in the first control mode so that the voltage value of the at least one of the energy storage elements when the first control mode is executed falls within the first threshold range.

8. The power conversion device according to claim 3, wherein
when a peak value of pulsation of the voltage value of the at least one of the energy storage elements becomes the same as an AC voltage command value for the arm, the controlling circuitry adjusts a phase of the AC component that the circulation current contains, to a second phase, so that a magnitude of an energy variation amount of the at least one of the energy storage elements at a phase when the peak value of pulsation of the voltage value of the at least one of the energy storage elements has become the same as the AC voltage command value for the arm increases in a positive direction, in the first control mode.

9. The power conversion device according to claim 3, wherein
a phase of the AC component to be adjusted by the controlling circuitry at time of execution of the first control mode is determined on the basis of an energy variation amount of the at least one of the energy storage elements derived from active power and reactive power of the power converter.

10. The power conversion device according to claim 2, wherein
the controlling circuitry adjusts a phase of the AC component that the circulation current contains in the first control mode, to a first phase, so that the voltage value of the at least one of the energy storage element when the first control mode is executed falls within the first threshold range.

11. The power conversion device according to claim 10, wherein
the controlling circuitry adjusts an amplitude of the AC component that the circulation current contains in the first control mode so that the voltage value of the at least one of the energy storage elements when the first control mode is executed falls within the first threshold range.

12. The power conversion device according to claim 10, wherein
when a peak value of pulsation of the voltage value of the at least one of the energy storage elements becomes the same as an AC voltage command value for the arm, the controlling circuitry adjusts a phase of the AC component that the circulation current contains, to a second phase, so that a magnitude of an energy variation amount of the at least one of the energy storage elements at a phase when the peak value of pulsation of the voltage value of the at least one of the energy storage elements has become the same as the AC voltage command value for the arm increases in a positive direction, in the first control mode.

13. The power conversion device according to claim 10, wherein
a phase of the AC component to be adjusted by the controlling circuitry at time of execution of the first control mode is determined on the basis of an energy variation amount of the at least one of the energy storage elements derived from active power and reactive power of the power converter.

14. The power conversion device according to claim 2, wherein
the controlling circuitry adjusts an amplitude of the AC component that the circulation current contains in the first control mode so that the voltage value of the at least one of the energy storage elements when the first control mode is executed falls within the first threshold range.

15. The power conversion device according to claim 2, wherein
when a peak value of pulsation of the voltage value of the at least one of the energy storage elements becomes the same as an AC voltage command value for the arm, the controlling circuitry adjusts a phase of the AC component that the circulation current contains, to a second phase, so that a magnitude of an energy variation amount of the at least one of the energy storage elements at a phase when the peak value of pulsation of the voltage value of the at least one of the energy storage elements has become the same as the AC voltage command value for the arm increases in a positive direction, in the first control mode.

16. The power conversion device according to claim 2, wherein
a phase of the AC component to be adjusted by the controlling circuitry at time of execution of the first control mode is determined on the basis of an energy variation amount of the at least one of the energy storage elements derived from active power and reactive power of the power converter.

17. The power conversion device according to claim 2, wherein
a second threshold range smaller by a set adjustment value than the first threshold range is provided,
in a case where the voltage value of the at least one of the energy storage elements exceeds the first threshold range in a kth cycle of the fundamental component of the plural-phase AC, the controlling circuitry executes the first control mode and sets the first threshold range to the second threshold range, in a (k+1)th cycle that is one cycle after the kth cycle, and
when the voltage value of the at least one of the energy storage elements exceeds the second threshold range in the (k+1)th cycle at time of execution of the first control mode, the controlling circuitry controls the circulation current so that values of a phase and an amplitude of the AC component contained in the circulation current at time of execution of the first control mode in the (k+1)th cycle are kept in a cycle after the (k+1)th cycle.

18. The power conversion device according to claim 17, wherein the adjustment value is set so that the voltage value of the at least one of the energy storage elements when the first control mode is executed exceeds the second threshold range, on the basis of an energy variation amount of the at least one of the energy storage elements and the values of the phase and the amplitude of the AC component contained in the circulation current at time of execution of the first control mode.

19. The power conversion device according to claim 17, wherein at time of execution of the first control mode, in a case where the voltage value of the at least one of the energy storage elements does not exceed the second threshold range in at least one cycle after the (k+1)th cycle of the fundamental component of the plural-phase AC, the controlling circuitry makes the first control mode inactive.

20. The power conversion device according to claim 1, wherein a voltage detector for detecting the voltage value of the at least one of the energy storage elements is provided to at least one of the converter cells included in each arm, and the controlling circuitry determines whether to make the first control mode active or inactive, on the basis of the voltage value of the at least one of the energy storage elements in at least one of the arms, detected by the voltage detector.

* * * * *